United States Patent
Masuda et al.

(10) Patent No.: US 10,547,787 B2
(45) Date of Patent: Jan. 28, 2020

(54) DISTANCE MEASUREMENT DEVICE, DISTANCE MEASUREMENT METHOD, AND DISTANCE MEASUREMENT PROGRAM

(71) Applicant: FUJIFILM CORPORATION, Minato-ku, Tokyo (JP)

(72) Inventors: Tomonori Masuda, Saitama (JP); Hiroshi Tamayama, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/438,733

(22) Filed: Jun. 12, 2019

(65) Prior Publication Data

US 2019/0297264 A1 Sep. 26, 2019

Related U.S. Application Data

(63) Continuation of application No. 15/333,142, filed on Oct. 24, 2016, now Pat. No. 10,368,000, which is a continuation of application No. PCT/JP2015/056875, filed on Mar. 9, 2015.

(30) Foreign Application Priority Data

May 2, 2014 (JP) .................................. 2014-095556
Aug. 5, 2014 (JP) .................................. 2014-159806

(51) Int. Cl.
*G01S 7/48* (2006.01)
*H04N 5/232* (2006.01)
(Continued)

(52) U.S. Cl.
CPC .......... *H04N 5/23267* (2013.01); *G01C 3/06* (2013.01); *G01C 3/08* (2013.01); *G01S 17/10* (2013.01);
(Continued)

(58) Field of Classification Search
CPC .................................................. G01S 7/4865
See application file for complete search history.

(56) References Cited

U.S. PATENT DOCUMENTS

| 5,130,732 A | 7/1992 | Furutsu |
| 2009/0219961 A1 | 9/2009 | Meyers et al. |

(Continued)

FOREIGN PATENT DOCUMENTS

| JP | H2-310414 A | 12/1990 |
| JP | 2002-207163 A | 7/2002 |

(Continued)

OTHER PUBLICATIONS

International Search Report issued in International Application No. PCT/JP2015/056875 dated Jun. 2, 2015.

(Continued)

*Primary Examiner* — Jeffery A Williams
(74) *Attorney, Agent, or Firm* — SOLARIS Intellectual Property Group, PLLC

(57) ABSTRACT

A distance measurement device includes an imaging optical system, an imaging unit, an emission unit, a derivation unit which performs a distance measurement to derive a distance to a subject based on a timing at which directional light is emitted by the emission unit and a timing at which reflected light is received by a light receiving unit, a shake correction unit which performs shake correction as correction of shake of the subject image caused by variation of an optical axis of the imaging optical system, and a control unit which performs control such that the shake correction unit does not perform shake correction or performs shake correction with a correction amount smaller than a normal correction amount determined in advance in a case of performing the distance measurement and performs shake correction with the normal correction amount in a case of not performing the distance measurement.

20 Claims, 17 Drawing Sheets

DISTANCE MEASUREMENT DEVICE 10

(51) Int. Cl.
*G01C 3/06* (2006.01)
*G01C 3/08* (2006.01)
*G03B 13/36* (2006.01)
*G01S 17/10* (2006.01)
*H04N 5/235* (2006.01)
*G01S 17/89* (2006.01)
*H04N 5/225* (2006.01)
*G03B 17/20* (2006.01)

(52) U.S. Cl.
CPC .............. *G01S 17/89* (2013.01); *G03B 13/36* (2013.01); *H04N 5/2256* (2013.01); *H04N 5/2351* (2013.01); *H04N 5/2353* (2013.01); *H04N 5/23212* (2013.01); *H04N 5/23258* (2013.01); *G03B 17/20* (2013.01); *G03B 2205/0023* (2013.01)

(56) References Cited

U.S. PATENT DOCUMENTS

2012/0133787 A1    5/2012  Yamaguchi
2014/0240721 A1*   8/2014  Herschbach .......... G01S 17/003
                                                356/625
2014/0321235 A1   10/2014  Ezekoye et al.

FOREIGN PATENT DOCUMENTS

| JP | 2008-96181 A   | 4/2008  |
| JP | 2008-275331 A  | 11/2008 |
| JP | 2011-27451 A   | 2/2011  |
| JP | 2012-114682 A  | 6/2012  |

OTHER PUBLICATIONS

Written Opinion of the ISA issued in International Application No. PCT/JP2015/056875 dated Jun. 2, 2015.
Written Opinion of the IPEA issued in International Application No. PCT/JP2015/056875 dated Feb. 16, 2016.
International Preliminary Report on Patentability issued in International Application No. PCT/JP2015/056875 dated Jul. 5, 2016.
Non-Final Office Action issued by USPTO dated Nov. 9, 2018, in related U.S. Appl. No. 15/333,142.
Notice of Allowance issued by USPTO dated Mar. 27, 2019, in related U.S. Appl. No. 15/333,142.

* cited by examiner

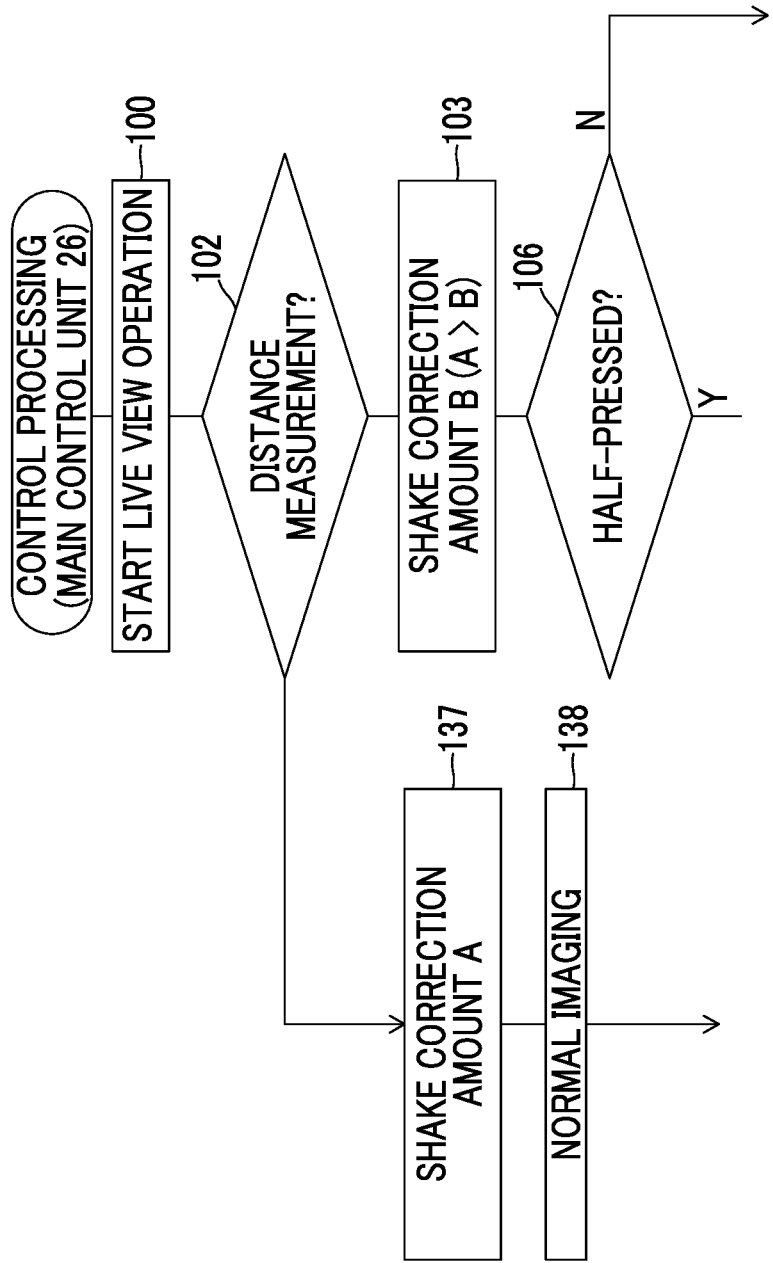

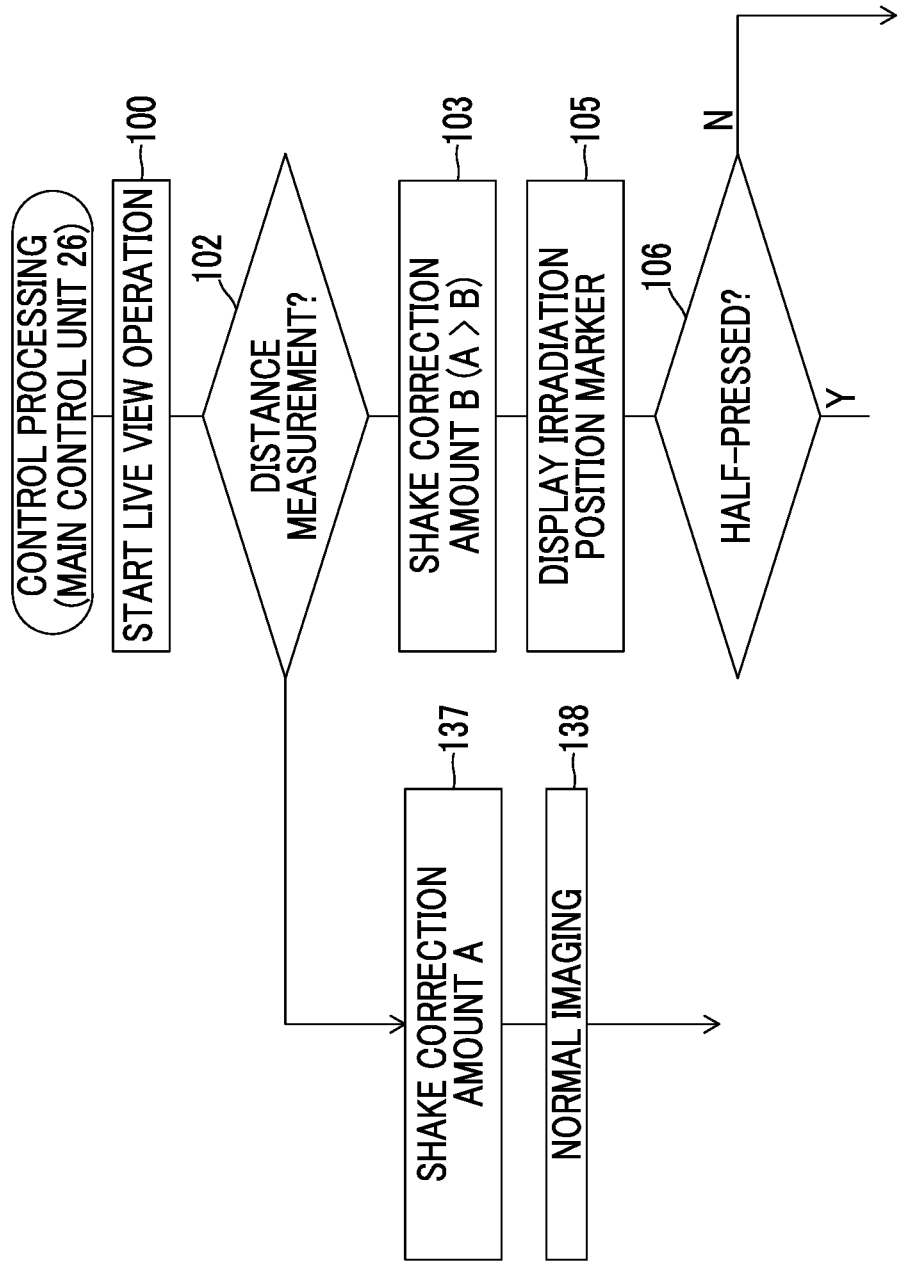

| SUBJECT BRIGHTNESS | LIGHT EMISSION FREQUENCY |
|---|---|
| $L_1$ | $N_1$ |
| $L_2$ | $N_2$ |
| ⋮ | ⋮ |
| $L_n$ | $N_n$ |

300

| EXPOSURE STATE SPECIFICATION INFORMATION | LIGHT EMISSION FREQUENCY |
|---|---|
| $E_1$ | $N_1$ |
| $E_2$ | $N_2$ |
| ⋮ | ⋮ |
| $E_n$ | $N_n$ |

DISTANCE MEASUREMENT DEVICE, DISTANCE MEASUREMENT METHOD, AND DISTANCE MEASUREMENT PROGRAM

CROSS-REFERENCE TO RELATED APPLICATIONS

This application is a continuation application of U.S. patent application Ser. No. 15/333,142, filed Oct. 24, 2016, which is a continuation application of International Application No. PCT/JP2015/056875, filed Mar. 9, 2015, and claims priority from Japanese Patent Application No. 2014-095556, filed May 2, 2014, and Japanese Patent Application No. 2014-159806, filed Aug. 5, 2014. The disclosures of all of the above applications are incorporated herein by reference in their entireties.

BACKGROUND

1. Technical Field

A technique of the present disclosure relates to a distance measurement device, a distance measurement method, and a distance measurement program.

2. Related Art

JP2008-96181A discloses a device including time detection means for detecting the time from the emission of measurement light to the reception of measurement light by light receiving means, shake amount detection means for detecting a shake amount of a housing during emission of measurement light when measurement light is emitted from light emitting means, and distance determination means for determining the distance to an object to be measured based on the time detected by the time detection means and the shake amount detected by the shake amount detection means.

JP2002-207163A discloses a distance measurement and imaging device having a function of performing focus adjustment, a distance measurement function of measuring a distance to a subject by irradiating the subject with a laser beam along an optical axis of a lens and detecting reflected light of the laser beam, and an imaging function of imaging the subject.

SUMMARY

On the other hand, typically, in a case where a distance measurement is performed by a distance measurement device, the distance measurement device is used in a state of being held by a user. In this state, if a phenomenon in which the vibration of the hand of the user is transmitted to cause the vibration of the distance measurement device, that is, camera shake, occurs, an optical axis of an imaging optical system included in the distance measurement device varies with camera shake. In a case where the distance measurement device is mounted in a vehicle, the vibration of the vehicle may be transmitted to cause the vibration of the distance measurement device and the optical axis of the imaging optical system may vary. Here, the variation of the optical axis means that the optical axis is inclined with respect to a reference axis (for example, an optical axis before camera shake occurs).

In this way, if the optical axis of the imaging optical system varies, image shake or image blur (hereinafter, in a case where there is no need for distinction, referred to as "shake") occurs. "Image shake" indicates, for example, a phenomenon in which a subject image is deviated from a reference position (for example, the position of the subject image obtained in a state where image shake does not occur) with variation of the optical axis of the imaging optical system included in the distance measurement device. "Image blur" indicates, for example, a phenomenon in which an image obtained by imaging is deviated from a reference position with the relative movement of the optical axis with respect to the subject due to camera shake or the like.

In the technique of the related art, in a case of performing correction (shake correction) of shake, the position of the subject image formed on the imaging unit may vary, and in this case, if a distance measurement is performed, there is a concern that distance measurement accuracy is degraded.

An embodiment of the invention has been suggested in consideration of such a situation, and provides a distance measurement device, a distance measurement method, and a distance measurement program capable of suppressing degradation of distance measurement accuracy due to shake correction.

In order to attain the above-described object, a distance measurement device according to a first aspect of the invention comprises an imaging optical system which forms a subject image indicating a subject, an imaging unit which captures the subject image formed by the imaging optical system, an emission unit which emits directional light as light having directivity along an optical axis direction of the imaging optical system, a light receiving unit which receives reflected light of the directional light from the subject, a derivation unit which performs a distance measurement to derive a distance to the subject based on a timing at which the directional light is emitted by the emission unit and a timing at which the reflected light is received by the light receiving unit, a shake correction unit which performs shake correction as correction of shake of the subject image caused by variation of the optical axis of the imaging optical system, and a control unit which performs control such that the shake correction unit does not perform the shake correction or performs the shake correction with a correction amount smaller than a normal correction amount determined in advance in a case of performing the distance measurement and performs the shake correction with the normal correction amount in a case of not performing the distance measurement.

According to a second aspect of the invention, the distance measurement device according to the first aspect of the invention may further comprise a reception unit which receives an input of an instruction regarding whether or not to perform the distance measurement by the emission unit, the light receiving unit, and the derivation unit, and the control unit may perform control such that the shake correction unit does not perform the shake correction or performs the shake correction with a correction amount smaller than a normal correction amount determined in advance in a case where an input of an instruction to perform the distance measurement is received by the reception unit and performs the shake correction with the normal correction amount in a case where an input of an instruction not to perform the distance measurement is received by the reception unit.

According to a third aspect of the invention, the distance measurement device according to the first or second aspect of the invention may further comprise a detection unit which detects the shake, the shake correction unit may calculate a correction amount for correcting the shake based on a detection result of the detection unit, and the control unit may calculate an irradiation position of the directional light irradiated from the emission unit based on the calculated correction amount and may display a marker representing the calculated irradiation position on a display unit.

According to a fourth aspect of the invention, in the distance measurement device according to the third aspect of the invention, the control unit controls the size of the mark representing the irradiation position based on the calculated correction amount.

According to a fifth aspect of the invention, in the distance measurement device according to any one of the first to fourth aspects of the invention, the derivation unit may perform the derivation of the distance multiple times and may derive a distance having a high frequency among the distances obtained by deriving the distance multiple times as a final distance.

According to a sixth aspect of the invention, the distance measurement device according to the fifth aspect of the invention may further comprise an execution unit which executes at least one of focus adjustment of the imaging optical system with respect to the subject or exposure adjustment, and in a case where the execution unit executes the focus adjustment, and in a case of deriving the distance, the derivation unit may determine a distance range for use when determining the frequency or a time range from the emission of the directional light to the reception of the directional light based on focusing state specification information and may derive the final distance within the determined distance range or the determined time range.

According to a seventh aspect of the invention, in the distance measurement device according to the sixth aspect of the invention, in a case of deriving the distance, the derivation unit may derive the final distance with a resolution determined according to a result of determination of the distance range or the time range.

According to an eighth aspect of the invention, in the distance measurement device according to any one of the first to seventh aspects of the invention, the emission unit may be able to adjust the emission intensity of the directional light and may adjust the emission intensity based on at least one of focusing state specification information and subject brightness or exposure state specification information to emit the directional light.

According to a ninth aspect of the invention, in the distance measurement device according to the eighth aspect of the invention, the emission unit may make the emission intensity lower when a focal distance indicated by the focusing state specification information is shorter.

According to a tenth aspect of the invention, in the distance measurement device according to the eighth or ninth aspect of the invention, the emission unit may make the emission intensity lower when the subject brightness is lower and may make the emission intensity lower when the exposure indicated by the exposure state specification information is higher.

According to an eleventh aspect of the invention, in the distance measurement device according to any one of the first to tenth aspects of the invention, the light receiving unit may be able to adjust light receiving sensitivity and may adjust the light receiving sensitivity based on focusing state specification information to receive the reflected light.

According to a twelfth aspect of the invention, in the distance measurement device according to the eleventh aspect of the invention, the light receiving unit may make the light receiving sensitivity lower when a focal distance indicated by the focusing state specification information is shorter.

According to a thirteenth aspect of the invention, the distance measurement device according to any one of the first to twelfth aspects of the invention may further comprise a display unit which displays an image, and the control unit may perform control such that the display unit displays a motion image captured by the imaging unit and displays information relating to the distance to the subject derived by the derivation unit.

According to a fourteenth aspect of the invention, in the distance measurement device according to any one of the first to thirteenth aspects of the invention, a distance measurement by the emission unit, the light receiving unit, and the derivation unit may be performed a number of times determined in advance according to subject brightness or exposure state specification information. With this, the distance measurement device of the fourteenth aspect can obtain a distance measurement result, in which the influence of noise of ambient light is moderated, compared to a case where the light emission frequency of directional light is fixed regardless of subject brightness.

According to a fifteenth aspect of the invention, in the distance measurement device according to the fourteenth aspect of the invention, a distance measurement by the emission unit, the light receiving unit, and the derivation unit may be performed a larger number of times when the subject brightness is higher or when the exposure indicated by the exposure state specification information is lower. With this, the distance measurement device according to the fifteenth aspect of the invention can obtain a distance measurement result, in which the influence of noise of ambient light is moderated, compared to a case where the light emission frequency of directional light is fixed regardless of high subject brightness.

According to a sixteenth aspect of the invention, the distance measurement device according to any one of the first to fifteenth aspects of the invention may further comprise a storage unit which stores the distance derived by the derivation unit, and storage by the storage unit may be stopped in a case where the derivation of the distance by the derivation unit is impossible. With this, the distance measurement device according to the sixteenth aspect of the invention can prevent storage of incomplete distance data.

According to a seventeenth aspect of the invention, the distance measurement device according to the sixteenth aspect of the invention may further comprise a storage setting unit which sets whether or not to stop storage by the storage unit in a case where the derivation of the distance by the derivation unit is impossible. With this, the distance measurement device according to the seventeenth aspect of the invention can set whether or not to perform storage into the storage unit according to a user's intention in a case where the derivation of the distance is impossible.

According to an eighteenth aspect of the invention, in the distance measurement device according to any one of the first to seventeenth aspects of the invention, the derivation unit may derive the distance in a case where there is no focus adjustment error by a focus adjustment unit performing focus adjustment of the imaging optical system with respect to the subject and there is no exposure adjustment error by an exposure adjustment unit adjusting exposure in a case where the imaging unit performs imaging. With this, the distance measurement device according to the eighteenth aspect of the invention can obtain a distance measurement result along with an image subjected to focusing and exposure adjustment.

A distance measurement method according to a nineteenth aspect of the invention comprises performing a distance measurement to derive a distance to a subject based on a timing at which directional light is emitted by an emission unit emitting directional light as light having directivity along an optical axis direction of an imaging optical system forming a subject image indicating the subject and a timing at which reflected light is received by a light receiving unit receiving the reflected light of the directional light from the subject, and performing control such that a shake correction unit does not perform shake correction as correction of shake of the subject image caused by variation of the optical axis of the imaging optical system or performs the shake correction with a correction amount smaller than a normal correction amount determined in advance in a case of performing the distance measurement and performs the shake correction with the normal correction amount in a case of not performing the distance measurement.

A distance measurement program according to a twentieth aspect of the invention causes a computer to execute processing including performing a distance measurement to derive a distance to a subject based on a timing at which directional light is emitted by an emission unit emitting directional light as light having directivity along an optical axis direction of an imaging optical system forming a subject image indicating the subject and a timing at which reflected light is received by a light receiving unit receiving the reflected light of the directional light from the subject, and performing control such that a shake correction unit does not perform shake correction as correction of shake of the subject image caused by variation of the optical axis of the imaging optical system or performs the shake correction with a correction amount smaller than a normal correction amount determined in advance in a case of performing the distance measurement and performs the shake correction with the normal correction amount in a case of not performing the distance measurement.

According to an embodiment of the invention, it is possible to suppress degradation of distance measurement accuracy due to shake correction.

BRIEF DESCRIPTION OF THE DRAWINGS

Exemplary embodiments according to the technique of the present disclosure will be described in detail based on the following figures, wherein:

FIG. 8 is a flowchart showing another example of a flow of control processing which is executed by the main control unit of the distance measurement device according to this embodiment;

FIG. 9 is a flowchart showing another example of a flow of control processing which is executed by the main control unit of the distance measurement device according to this embodiment;

DETAILED DESCRIPTION

Hereinafter, an example of an embodiment of a distance measurement device according to the technique of the present disclosure will be described referring to the accompanying drawings. In this embodiment, a "distance measurement" indicates a measurement of a distance to a subject to be a measurement target.

Figure 1:
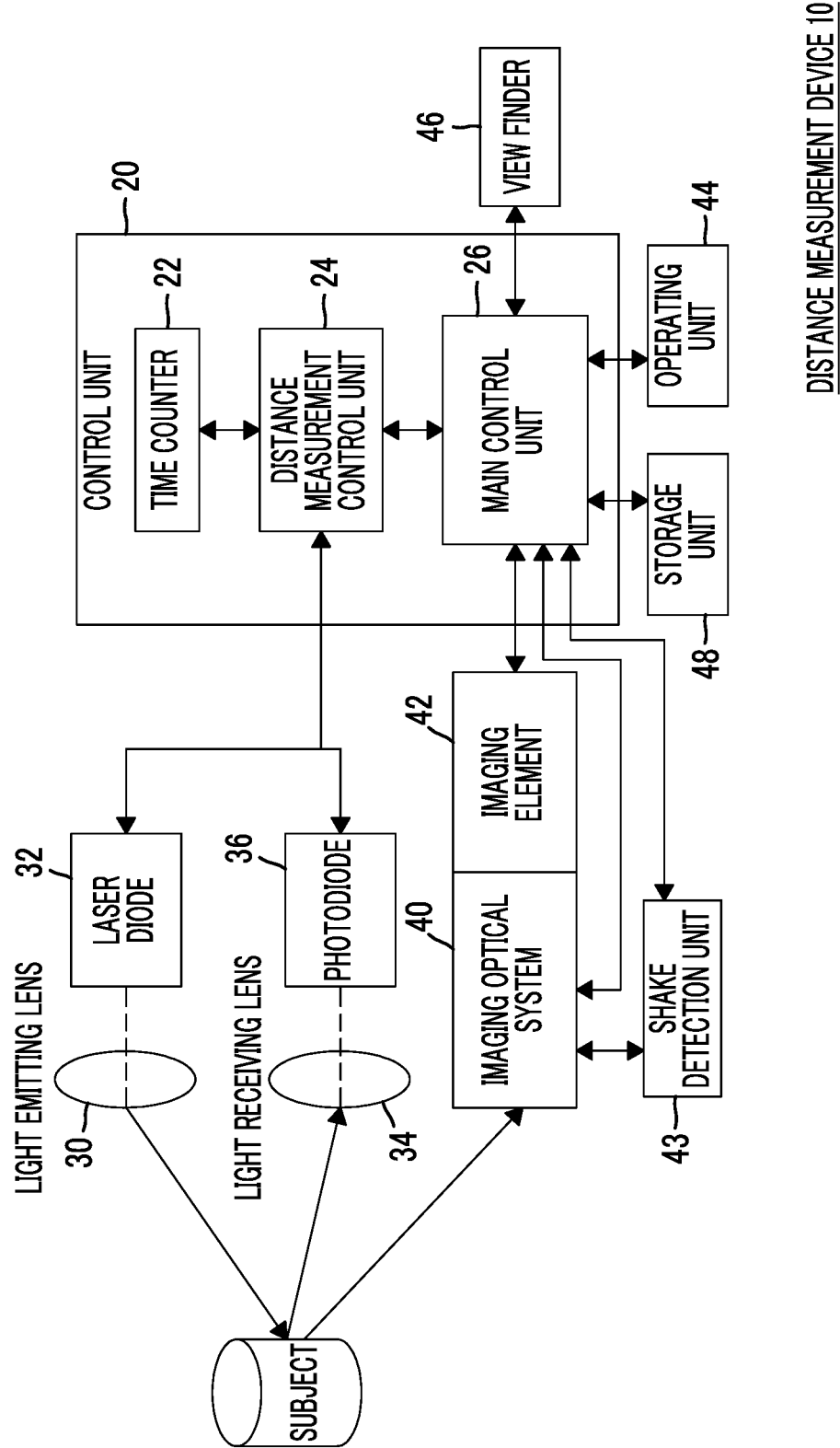
FIG. 1 is a block diagram showing an example of the configuration of a main part of a distance measurement device according to this embodiment.

First, the configuration of the distance measurement device according to this embodiment will be described. FIG. 1 is a block diagram showing the configuration of a main part of a distance measurement device 10 according to this embodiment.

The distance measurement device 10 of this embodiment has a function of performing a distance measurement and a function of generating a captured image obtained by imaging a subject. The distance measurement device 10 of this embodiment comprises a control unit 20, a light emitting lens 30, a laser diode 32, a light receiving lens 34, a photodiode 36, an imaging optical system 40, an imaging element 42, an operating unit 44, a view finder 46, and a storage unit 48.

The control unit 20 comprises a time counter 22, a distance measurement control unit 24, and a main control unit 26. The time counter 22 has a function of generating a count signal in each given period determined in advance according to a signal (for example, a clock pulse) input from the main control unit 26 through the distance measurement control unit 24.

The distance measurement control unit 24 has a function of performing a distance measurement under the control of the main control unit 26. The distance measurement control unit 24 of this embodiment controls the driving of the laser diode 32 at a timing according to the count signal generated by the time counter 22 to perform the distance measurement. The distance measurement control unit 24 functions as a derivation unit according to the technique of the present disclosure. Specific implementation examples of the distance measurement control unit 24 include an application specific integrated circuit (ASIC), a field-programmable gate array (FPGA), and the like. The distance measurement control unit 24 of this embodiment has a storage unit (not shown). Specific examples of the storage unit in the distance measurement control unit 24 include a nonvolatile storage unit, such as a read only memory (ROM), and a volatile storage unit, such as a random access memory (RAM).

The main control unit 26 has a function of controlling the entire distance measurement device 10. The main control unit 26 of this embodiment has a function of controlling the imaging optical system 40 and the imaging element 42 to image a subject and generating a captured image (subject image). The main control unit 26 functions as a control unit, a shake correction unit, a brightness detection unit, a focus adjustment unit, and an exposure adjustment unit according to the technique of the present disclosure. Specific examples of the main control unit 26 include a central processing unit (CPU) and the like. The distance measurement control unit 24 of this embodiment has a storage unit (not shown). Specific examples of the storage unit in the distance measurement control unit 24 include a nonvolatile storage unit, such as a ROM, and a volatile storage unit, such as a RAM. A control program described below is stored in the ROM in advance.

The main control unit 26 of this embodiment has a function of performing correction (shake correction) of shake. The term "shake" used herein indicates, for example, image shake or image blur accompanied by a phenomenon (camera shake) in which the vibration of the hand of the user is transmitted to cause the vibration of the distance measurement device 10, a phenomenon in which the vibration of a vehicle is transmitted to the distance measurement device 10 mounted in the vehicle (not shown) to cause the vibration of the distance measurement device 10, or the like. The term "image shake" indicates, for example, a phenomenon in which a subject image is deviated from a reference position (for example, the position of the subject image obtained in a state where camera shake does not occur) with variation of the optical axis of the imaging optical system 40. Furthermore, "image blur" indicates, for example, a phenomenon in which an image obtained by imaging is deviated from a reference position with relative movement of the optical axis of the imaging optical system 40 with respect to the subject due to camera shake or the like. The main control unit 26 of this embodiment performs shake correction of a so-called CCD shift system. The main control unit 26 performs shake correction based on a detection result of the shake detection unit 43 by moving the imaging element 42 and adjusting a subject image to be formed on the imaging element 42 in a case where shake occurs. In this embodiment, the user can operate the operating unit 44 to select whether or not to perform shake correction. A system of shake correction is not limited to a CCD shift system, and other general systems (for example, lens shift system shake correction in which a vibration-proof lens (not shown) included in the imaging optical system 40 varies according to a detection result of the shake detection unit 43, electronic correction processing of correcting image blur by processing an image signal obtained by imaging, and the like) may be applied. In this embodiment, "shake correction" includes a meaning of reduction in shake, in addition to a meaning of elimination of shake.

A program of control processing is not necessarily stored in the main control unit 26 from the beginning. For example, a control program may be stored in advance in an arbitrary portable storage medium, such as a solid state drive (SSD), a CD-ROM, a DVD, a magneto-optical disk, or an IC card. The distance measurement device 10 may acquire the control program from the portable storage medium storing the control program and may store the control program in the main control unit 26 or the like. Furthermore, the distance measurement device 10 may acquire the control program from other external devices through the Internet or a local area network (LAN) and may store the control program in the main control unit 26 or the like.

The operating unit 44 is a user interface which is operated by the user when various instructions are provided to the distance measurement device 10. The operating unit 44 includes a release button, a distance measurement instruction button, and buttons, keys, or the like (all of these are not shown) which are used when the user provides various instructions. Various instructions received by the operating unit 44 are output to the main control unit 26 as operation signals, and the main control unit 26 executes processing according to the operation signals input from the operating unit 44. The operating unit 44 is an example of a reception unit according to the technique of the present disclosure.

The shake detection unit 43 has a function of detecting shake, and comprises, for example, a sensor, such as a gyro sensor.

The release button of the operating unit 44 detects a two-stage pressing operation of an imaging preparation instruction state and an imaging instruction state. The imaging preparation instruction state indicates, for example, a state of being pressed from a standby position to an intermediate position (half-pressing position), and the imaging instruction state indicates a state of being pressed to a final pressing position (fully pressing position) beyond the intermediate position. Hereinafter, "the state of being pressed from the standby position to the half-pressing position" refers to a "half-pressing state", and "the state of being pressed from the standby position to the fully pressing position" refers to a "fully pressing state".

In the distance measurement device 10 according to this embodiment, a manual focus mode and an auto-focus mode are selectively set according to a user's instruction. In the auto-focus mode, adjustment of imaging conditions is performed by bringing the release button of the operating unit 44 into the half-pressing state, and then, exposure (imaging) is performed by successively bringing the release button into the fully pressing state. That is, if the release button of the operating unit 44 is brought into the half-pressing state, an automatic exposure (AE) function is operated to perform exposure adjustment, and an auto-focus (AF) function is operated to perform focusing control, and if the release button is brought into the fully pressing state, imaging is performed.

In this embodiment, the main control unit 26 transmits exposure state specification information for specifying an exposure state at the present time as a result of AE to the distance measurement control unit 24. The main control unit 26 transmits focusing state specification information for specifying a focusing state at the present time as a result of AF to the distance measurement control unit 24. Examples of the exposure state specification information include an F-number and a shutter speed derived from a so-called AE evaluation value uniquely determined according to subject brightness. Other examples of the exposure state specification information include an AE evaluation value. Examples of the focusing state specification information include the subject distance obtained by AF.

The storage unit 48 primarily stores image data obtained by imaging, and a nonvolatile memory is used therefor. Specific examples of the storage unit 48 include a flash memory or a hard disk drive (HDD).

The view finder 46 has a function of displaying images, character information, and the like. The view finder 46 of this embodiment is an electronic view finder (hereinafter, referred to as "EVF"), and is used for displaying a live view image (through-image) as an example of a continuous-frame image obtained by imaging in continuous frames during imaging. The view finder 46 is also used for displaying a still image as an image of a single-frame image obtained by imaging in a single frame in a case where an instruction to capture a still image is provided. In addition, the view finder 46 is also used for displaying a reproduced image in a playback mode or displaying a menu screen or the like.

The imaging optical system 40 comprises an imaging lens including a focus lens, a motor, a slide mechanism, and a shutter (all of these are not shown). The slide mechanism moves the focus lens along the optical axis direction (not shown) of the imaging optical system 40. The focus lens is attached so as to be slidable along the optical axis direction of the slide mechanism. The motor is connected to the slide mechanism, and the slide mechanism receives power of the motor and slides the focus lens along the optical axis direction. The motor is connected to the main control unit 26 of the control unit 20, and is controlled and driven according to a command from the main control unit 26. In the distance measurement device 10 of this embodiment, as a specific example of the motor, a stepping motor is applied. Accordingly, the motor is operated in synchronization with pulse power in response to a command from the main control unit 26.

In the distance measurement device 10 according to this embodiment, in the auto-focus mode, the main control unit 26 performs focusing control by driving and controlling the motor of the imaging optical system 40 such that a contrast value of an image obtained by imaging with the imaging element 42 becomes the maximum. Furthermore, in the auto-focus mode, the main control unit 26 calculates AE information which is a physical quantity indicating brightness of an image obtained by imaging. The main control unit 26 derives a shutter speed and an F-number (aperture value) according to the brightness of the image indicated by the AE information when the release button of the operating unit 44 is brought into the half-pressing state. The main control unit 26 performs exposure adjustment by controlling respective related units such that the derived shutter speed and F-number are obtained.

The imaging element 42 is an imaging element comprising color filters (not shown), and functions as an imaging unit according to the technique of the present disclosure. In this embodiment, as an example of the imaging element 42, a CMOS type image sensor is used. The imaging element 42 is not limited to a CMOS type image sensor, and may by, for example, a CCD image sensor. The color filters include a G filter corresponding green (G) most contributing to obtaining a brightness signal, an R filter corresponding to red (R), and a B filter corresponding to blue (B). Any filter of "R", "G", and "B" included in the color filters is allocated to each of the pixels (not shown) of the imaging element 42.

In a case of imaging a subject, image light indicating the subject is formed on the light receiving surface of the imaging element 42 through the imaging optical system 40. The imaging element 42 has a plurality of pixels (not shown) arranged in a matrix in a horizontal direction and a vertical direction, and signal charges according to image light are stored in the pixels of the imaging element 42. The signal charges stored in the pixels of the imaging element 42 are sequentially read as digital signals according to the signal charges (voltages) under the control of the main control unit 26. In the distance measurement device 10 of this embodiment, the signal charges are sequentially read in units of pixels for each horizontal direction, that is, for each pixel row. In a period from when the electric charges are read from the pixels of one pixel row until the electric charges are read from the pixels of the next pixel row, a period (hereinafter, referred to as a "horizontal blanking period") during which the signal charges are not read is generated.

The imaging element 42 has a so-called electronic shutter function, and operates the electronic shutter function to control an electric charge storage time (shutter speed) of each photosensor at a timing under the control of the main control unit 26.

The imaging element 42 outputs the digital signals indicating the pixel values of the captured image from the respective pixels. The captured image output from the respective pixels is a chromatic image, and is, for example, a color image having the same color arrangement as the pixel arrangement. The captured image (frames) output from the imaging element 42 is temporarily stored (overwritten and saved) in the storage unit of the main control unit 26 or a RAW image storage area (not shown) of the storage unit 48 determined in advance through the main control unit 26.

The main control unit 26 subjects the frames to various kinds of image processing. The main control unit 26 has a white balance (WB) gain unit, a gamma correction unit, and a synchronization processing unit (all of these are not shown), and sequentially performs signal processing for the original digital signals (RAW images) temporarily stored in the main control unit 26 or the like in each processing unit. That is, the WB gain unit executes white balance (WB) adjustment by adjusting the gain of each of R, G, and B signals. The gamma correction unit performs gamma correction of each of the R, G, and B signals subjected to the WB adjustment in the WB gain unit. The synchronization processing unit performs color interpolation processing corresponding to the arrangement of the color filters of the imaging element 42 and generates the synchronized R, G, and B signals. Each time the RAW image for one screen is acquired by the imaging element 42, the main control unit 26 performs image processing for the RAW image in parallel.

The main control unit 26 outputs image data of the generated captured image for recording to an encoder (not shown), which converts an input signal to a signal in a different format. The R, G, and B signals processed by the main control unit 26 are converted (encoded) to signals for recording by the encoder, and the signals for recording are recorded in the storage unit 48. The captured image for display processed by the main control unit 26 is output to the view finder 46. Hereinafter, for convenience of description, in a case where there is no need for distinction between the "captured image for recording" and the "captured image for display", the expression "for recording" and the expression "for display" are omitted and the captured image for recording and the captured image for display are referred to as "captured images".

The main control unit 26 of this embodiment displays a live view image on the view finder 46 by performing control for continuously displaying the captured images for display as a motion image.

The light emitting lens 30 and the laser diode 32 function as an example of an emission unit according to the technique of the present disclosure. The laser diode 32 is driven based on an instruction from the distance measurement control unit 24 and has a function of emitting a laser beam toward the subject to be a measurement target through the light emitting lens 30 in the optical axis direction of the imaging optical system 40. Specific examples of the light emitting lens 30 of this embodiment include an objective lens or the like. The laser beam emitted from the laser diode 32 is an example of directional light according to the technique of the present disclosure.

The light receiving lens 34 and the photodiode 36 function as an example of a light receiving unit according to the technique of the present disclosure. The photodiode 36 has a function of receiving the laser beam emitted from the laser diode 32 and reflected from the subject through the light receiving lens 34 and outputting an electrical signal according to the amount of received light to the distance measurement control unit 24.

If the user provides an instruction to measure (distance measurement) a distance to a subject using the distance measurement instruction button or the like of the operating unit 44, the main control unit 26 instructs the distance measurement control unit 24 to perform a distance measurement. Specifically, in this embodiment, the main control unit 26 instructs the distance measurement control unit 24 to perform a distance measurement by transmitting a distance measurement instruction signal to the distance measurement control unit 24. In a case of performing a measurement of a distance to a subject and imaging of the subject in parallel, the main control unit 26 transmits a synchronization signal for synchronizing a distance measurement operation and an imaging operation to the distance measurement control unit 24.

If the synchronization signal and the distance measurement instruction signal are received, the distance measurement control unit 24 controls the light emission of the laser diode 32 at a timing according to the count signal of the time counter 22 and controls a timing of emitting a laser beam toward the subject. The distance measurement control unit 24 samples the electric signal according to the amount of received light output from the photodiode 36 at the timing according to the count signal of the time counter 22.

The distance measurement control unit 24 derives the distance to the subject based on the light emission timing at which the laser diode 32 emits a laser beam and the light reception timing at which the photodiode 36 receives the laser beam, and outputs distance data representing the derived distance to the main control unit 26. The main control unit 26 displays information relating to the distance to the subject on the view finder 46 based on distance data. The main control unit 26 stores distance data in the storage unit 48.

Figure 2:
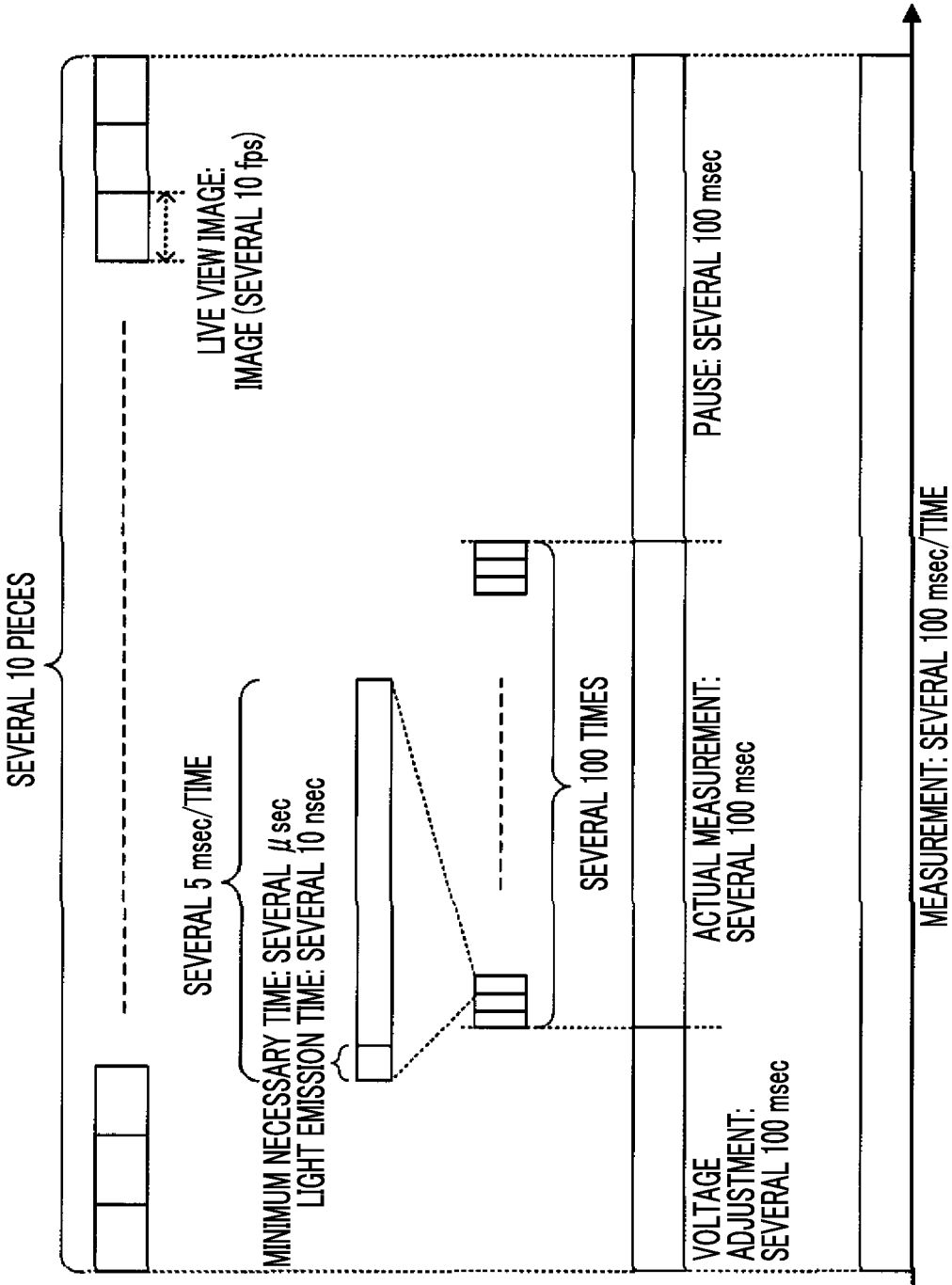
FIG. 2 is a timing chart showing an example of a timing of a distance measurement operation to measure a distance to a subject in the distance measurement device according to this embodiment.

The measurement of the distance to the subject by the distance measurement control unit 24 will be described in more detail. FIG. 2 is a timing chart showing an example of a timing of the distance measurement operation in the measurement of the distance to the subject in the distance measurement device 10.

In the distance measurement device 10 of this embodiment, a single distance measurement (measurement) sequence includes a voltage adjustment period, an actual measurement period, and a pause period. The voltage adjustment period refers to a period during which a drive voltage of the laser diode 32 and the photodiode 36 is adjusted to an appropriate voltage value. As a specific example, in the distance measurement device 10 of this embodiment, as shown in FIG. 2, the voltage adjustment period is set to several 100 msec (milliseconds).

The actual measurement period refers to a period in which the distance to the subject is actually measured. In the distance measurement device 10 of this embodiment, as a specific example, as shown in FIG. 2, the distance to the subject is measured by repeating an operation to emit a laser beam and to receive the laser beam reflected from the subject several 100 times and measuring the elapsed time from light emission to light reception. That is, in the distance measurement device 10 of this embodiment, in the single measurement sequence, the measurement of the distance to the subject is performed several 100 times.

Figure 3:
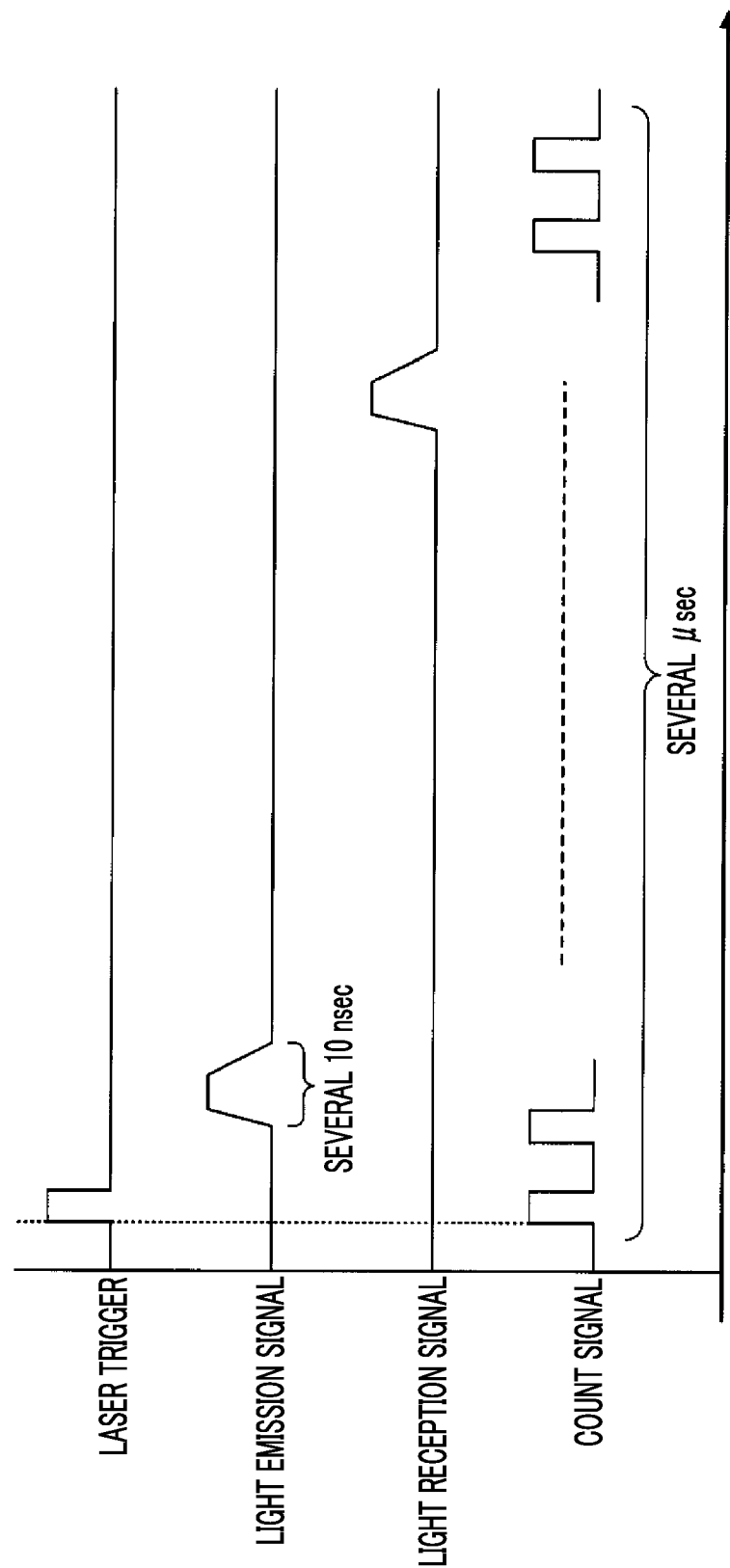
FIG. 3 is a timing chart showing an example of a timing from light emission to light reception in a single measurement in the distance measurement device of the first embodiment.

FIG. 3 is an example of a timing chart showing a timing from light emission to light reception in a single measurement. In a case of performing a measurement, the distance measurement control unit 24 outputs a laser trigger for causing the laser diode 32 to emit light according to the count signal of the time counter 22 to the laser diode 32. The laser diode 32 emits light according to the laser trigger. In the distance measurement device 10 of this embodiment, as a specific example, the light emission time of the laser diode 32 is set to several 10 nsec (nanoseconds). The emitted laser beam is emitted toward the subject through the light emitting lens 30 in the optical axis direction of the imaging optical system 40. The laser beam emitted from the distance measurement device 10 is reflected from the subject and reaches the distance measurement device 10. The photodiode 36 of the distance measurement device 10 receives the reflected laser beam through the light receiving lens 34.

In the distance measurement device 10 of this embodiment, as a specific example, the distance measurement device performs a distance measurement for a subject within 1 km from the distance measurement device 10. The time until the laser beam emitted from the laser diode 32 toward the subject 1 km ahead through the light emitting lens 30 is returned (received) becomes 1 km×2/light speed≅several μsec (microseconds). Accordingly, in order to measure the distance to the subject 1 km ahead, as shown in FIG. 2, the time of at least several μsec is required.

In the distance measurement device 10 of this embodiment, the reciprocation time or the like of the laser beam is considered, and as a specific example, a single actual measurement time is set to several msec as shown in FIG. 2. Since the reciprocation time of the laser beam is different depending on the distance to the subject, the actual measurement time for each time may be different depending on the distance assumed by the distance measurement device 10.

Figure 4:
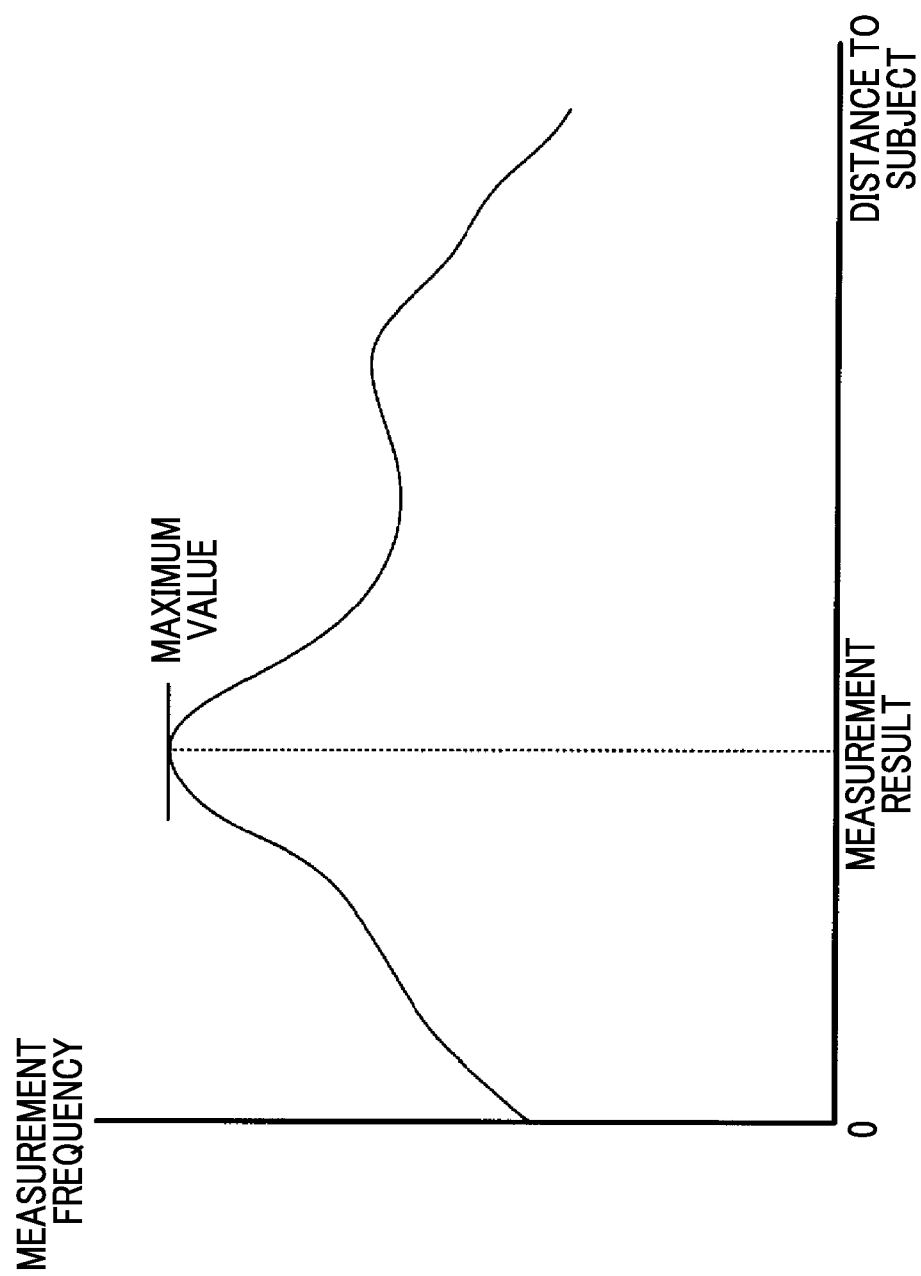
FIG. 4 is a graph showing an example of a histogram of measured values in a case where a distance to a subject is set as a horizontal axis and a measurement frequency is set as a vertical axis.

In the distance measurement device 10, the distance measurement control unit 24 derives the distance to the subject based on measured values obtained by performing a measurement several 100 times as described above. In the distance measurement control unit 24 of this embodiment, as a specific example, a histogram of measured values for several 100 times is analyzed to derive the distance to the subject. FIG. 4 is a graph showing an example of a histogram of measured values in a case where the distance to the subject is set as a horizontal axis and the measurement frequency is set as a vertical axis. The distance measurement control unit 24 derives the distance to the subject corresponding to a maximum value of the measurement frequency in the above-described histogram as a measurement result and outputs distance data indicating the derived measurement result to the main control unit 26. A histogram may be generated based on the reciprocation time (the elapsed time from light emission to light reception) of the laser beam or ½ of the reciprocation time of the laser beam, or the like, instead of the distance to the subject.

The pause period refers to a period for pausing the driving of the laser diode 32 and the photodiode 36. In the distance measurement device 10 of this embodiment, as a specific example, as shown in FIG. 2, the pause period is set to several 100 msec.

In the distance measurement device 10 of this embodiment, the single measurement time is set to several 100 msec.

In a case of not performing imaging, the main control unit 26 of the distance measurement device 10 of this embodiment displays a live view image on the view finder 46 as described above. The main control unit 26 performs the display of the live view image by displaying the captured images captured in several 10 fps (several 10 msec/image) on the view finder 46 as a motion image. For this reason, during the single measurement period, live view images for measurement period/fps are displayed on the view finder 46.

Next, the imaging operation and the distance measurement operation in a case where the imaging operation and the distance measurement operation in the distance measurement device 10 of this embodiment are synchronized will be described. Hereinafter, as a specific example, an imaging operation and a distance measurement operation in a case where an imaging operation to capture a still image and a distance measurement operation are synchronized will be described.

Figure 5:
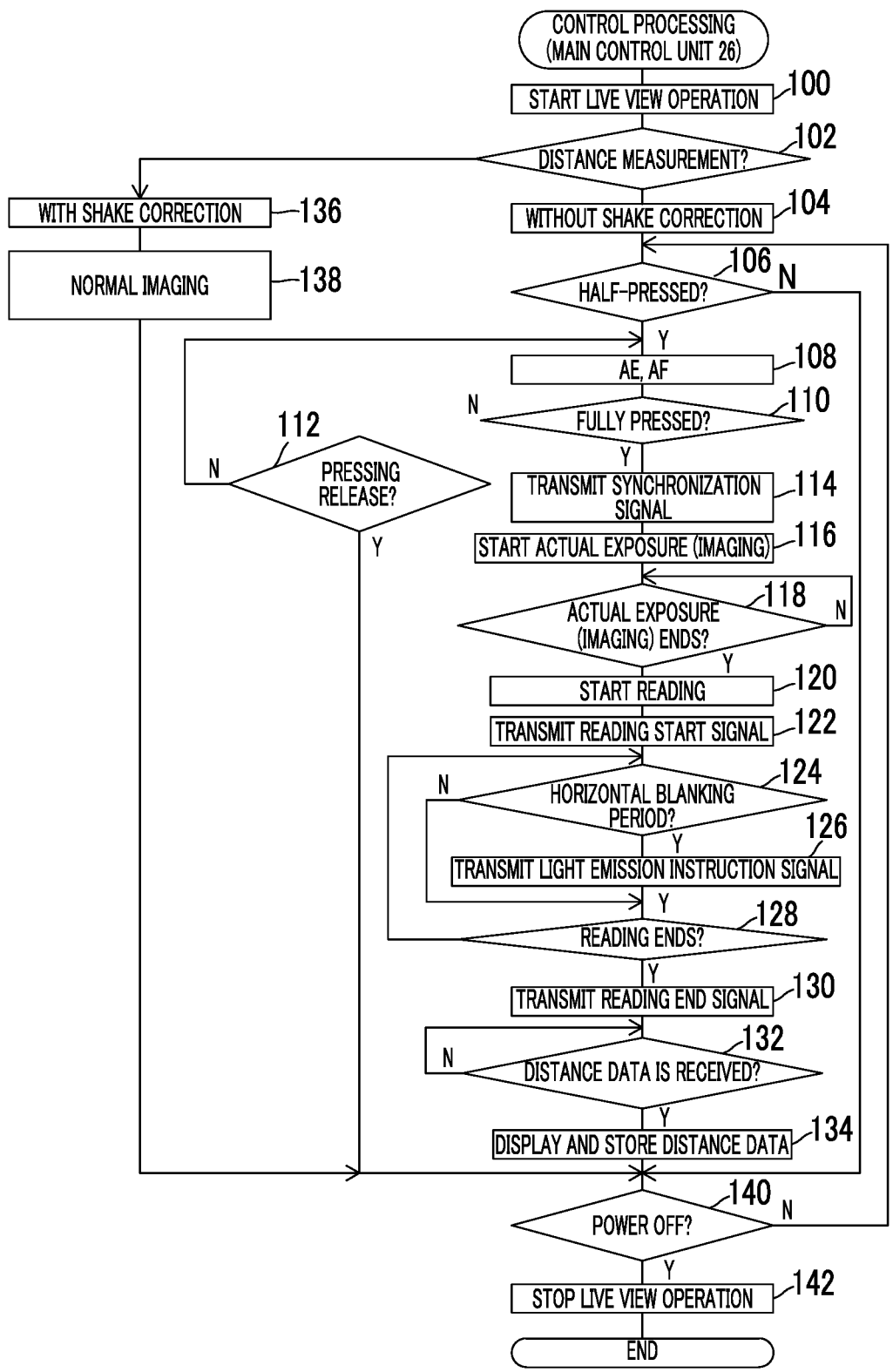
FIG. 5 is a flowchart showing an example of a flow of control processing which is executed by a main control unit of the distance measurement device according to this embodiment.
Figure 6:
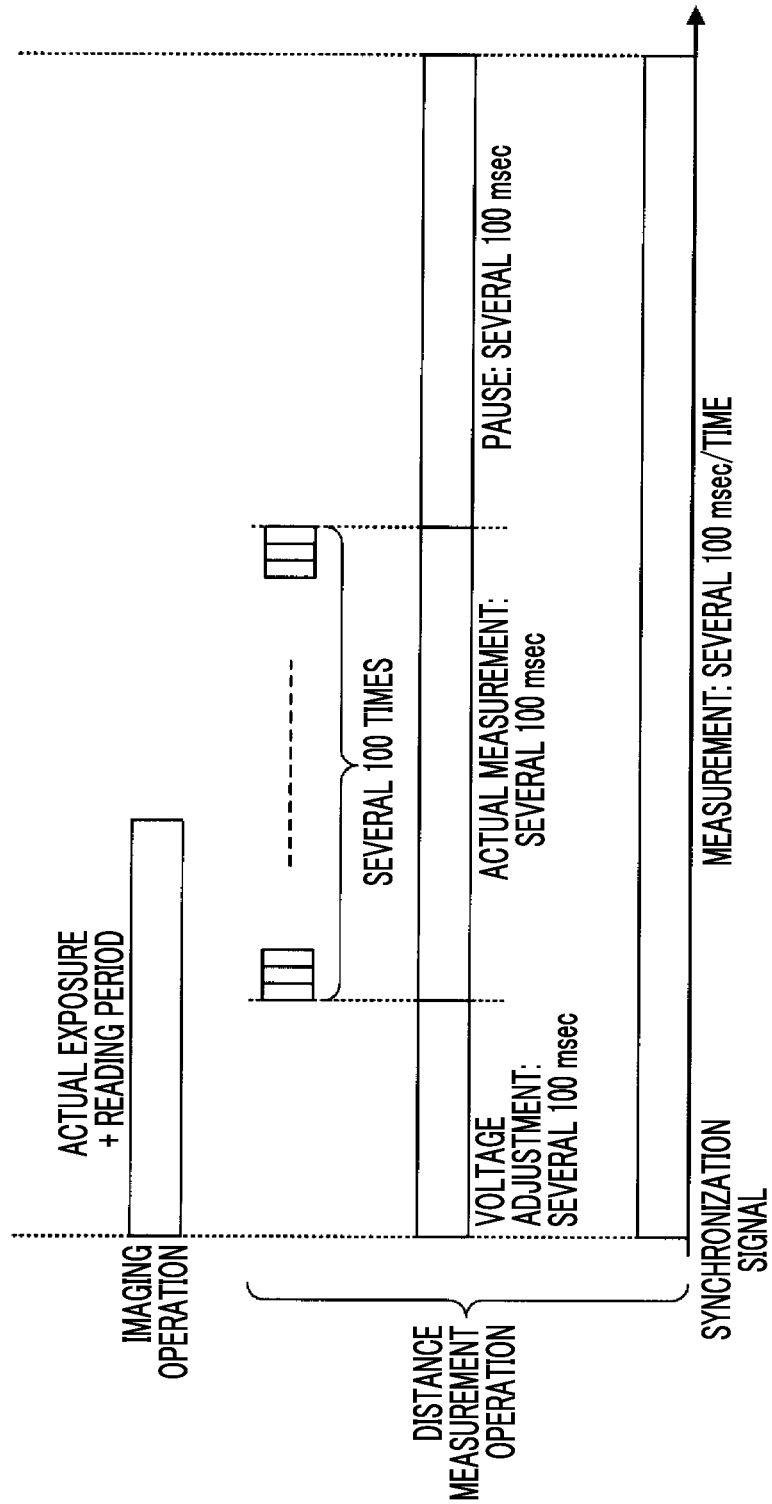
FIG. 6 is an example of a timing chart showing the timings of an imaging operation and a distance measurement operation in the distance measurement device according to this embodiment.

First, control processing which is executed by the main control unit 26 will be described. FIG. 5 is a flowchart showing an example of a flow of control processing which is executed by the main control unit 26 of the distance measurement device 10 of this embodiment. FIG. 6 shows an example of a timing chart showing the timings of the imaging operation and the distance measurement operation. The flowchart shown in FIG. 5 is executed if power is supplied to the distance measurement device 10.

First, in Step 100, the main control unit 26 starts a live view operation. As described above, the main control unit 26 displays the live view image on the view finder 46 by performing control for continuously displaying the captured images captured by the imaging optical system 40 and the imaging element 42 as a motion image.

Next, in Step 102, the main control unit 26 determines whether or not to perform a distance measurement.

In the distance measurement device 10 of this embodiment, as described above, shake correction of a so-called CCD shift system is performed by the main control unit 26. For this reason, since the imaging element 42 is moved, the position (image forming position) of the subject image is also moved. In this way, if a distance measurement is performed in a state where the position of the subject image is moved, a distance measurement location (a place where a laser beam is reflected) may be different from the central position of the captured image. In this case, there is a concern that distance measurement accuracy is degraded. For this reason, in the distance measurement device 10 of this embodiment, in a case where the distance measurement operation and the imaging operation are performed in parallel, the main control unit 26 performs control such that shake correction is not performed.

Whether or not to perform a distance measurement is determined according to whether or not the user instructs the distance measurement through the operating unit 44, or the like. In a case of not performing the distance measurement, the process progresses to Step 136. In a case of not performing the distance measurement, the above-described problem does not occur. For this reason, the main control unit 26 performs shake correction. With this, the main control unit 26 performs the imaging of the subject while performing shake correction. After this step, the process progresses to Step 138, and the imaging of the subject is performed by the main control unit 26. In the imaging of this case, since the distance measurement is not performed, a normal imaging operation (normal imaging) may be performed. Specifically, though details will be described below, the main control unit 26 performs the processing of Steps 106 to 112 and Steps 116 to 120, and may store the captured image (image data indicating the captured image) in the storage unit 48.

In a case of performing the distance measurement, that is, in a case of performing both of the imaging of the subject and the distance measurement of the distance to the subject, the process progresses to Step 104. In Step 104, shake correction is not performed. With this, the main control unit 26 performs the imaging of the subject without performing shake correction.

Next, in Step 106, the main control unit 26 determines whether or not the release button of the operating unit 44 is half-pressed. In a case where the release button is not half-pressed, for example, in a case where the release button is not pressed at all, or the like, the process progresses to Step 140. In a case where the release button is half-pressed, the process progresses to Step 108.

In Step 108, the main control unit 26 controls the imaging optical system 40 and performs AE and AF as described above. In the distance measurement device 10, exposure adjustment is performed by performing AE, focusing control is performed by performing AF, and image light indicating the subject is formed on the light receiving surface of the imaging element 42 in a focused state.

Next, in Step 110, the main control unit 26 determines whether or not the release button of the operating unit 44 is fully pressed. In a case where the release button is not fully pressed, the process progresses to Step 110. In Step 110, the main control unit 26 determines whether or not a pressing operation to the release button of the operating unit 44 is released. In a case where pressing is not released, the process returns to Step 108, and this processing is repeated. In a case where pressing is released, the process progresses to Step 140.

In a case where the release button is fully pressed, the process progresses from Step 110 to Step 114. In Step 114, the main control unit 26 transmits the synchronization signal to the distance measurement control unit 24. In this way, in the distance measurement device 10 of this embodiment, in order to synchronize the imaging operation by the main control unit 26 with the distance measurement operation by the distance measurement control unit 24, prior to the start of the imaging (actual exposure to the imaging element 42), the synchronization signal is transmitted from the main control unit 26 to the distance measurement control unit 24. Though details will be described below, in the distance measurement control unit 24, if the synchronization signal is received, the distance measurement operation (the measurement of the distance to the subject) starts.

Next, in Step 116, the main control unit 26 starts the actual exposure (imaging). With the start of the actual exposure, the pixels of the imaging element 42 are irradiated with light (image light is formed on the light receiving surface of the imaging element 42), and signal charges according to irradiated light are stored in the respective pixels.

Next, in Step 118, the main control unit 26 detects whether or not the actual exposure ends. The process is in a standby state until the actual exposure ends, and in a case where the actual exposure ends, the process progresses to Step 120. A determination method of whether or not the actual exposure ends is not limited, and as a specific example, a determination method based on determination of whether or not an actual exposure time determined under various conditions has elapsed is used.

In Step 120, the main control unit 26 starts the reading of the signal charges stored in the respective pixels of the imaging element 42. Next, in Step 122, the main control unit 26 outputs a reading start signal indicating the start of the reading to the distance measurement control unit 24.

The signal charges read from the respective pixels are transmitted to the main control unit 26 as electrical signals (image signals), which are digital signals according to the signal charges.

Next, in Step 124, the main control unit 26 determines whether or not it is the horizontal blanking period. As described above, in a case of reading the signal charges from the pixels of the imaging element 42, since the signal charges are read in units of pixels for each pixel row, the horizontal blanking period during which the reading of the signal charges are not performed is generated between the pixel rows. The main control unit 26 determines whether or not it is the horizontal blanking period, and in a case where it is not the horizontal blanking period, for example, while the signal charges are read from the pixels of one pixel row, the process progresses to Step 128. In a case of the horizontal blanking period, the process progresses to Step 126. In Step 126, the main control unit 26 transmits a light emission instruction signal to the distance measurement control unit 24. Though details will be described below, if the light emission instruction signal is received, the distance measurement control unit 24 causes the laser diode 32 to emit light based on the received light emission instruction signal.

Next, in Step 128, the main control unit 26 determines whether or not to end the reading. In a case where the signal charges are not yet read from all pixels of the imaging element 42, the process returns to Step 124, and this processing is repeated. In a case where the signal charges are read from all pixels of the imaging element 42, the process progresses to Step 130.

In Step 130, the main control unit 26 transmits a reading end signal indicating the end of the reading to the distance measurement control unit 24.

Next, in Step 132, the main control unit 26 determines whether or not distance data is received. Though details will be described below, if the distance to the subject is measured (distance measurement), the distance measurement control unit 24 transmits distance data indicating a measurement result to the main control unit 26. The process is in a standby state until distance data transmitted from the distance measurement control unit 24 is received, and in a case where distance data is received, the process progresses to Step 134.

In Step 134, the main control unit 26 displays information relating to the distance to the subject on the view finder 46 based on received distance data. The main control unit 26 stores received distance data in the storage unit 48 in correlation with the captured image. With this step, the captured image (image data indicating the captured image) obtained by imaging the subject and the distance (distance data) to the subject are stored in the storage unit 48 in a state of being correlated with each other.

Next, in Step 140, the main control unit 26 determines whether or not a power switch (not shown) is turned off. In a case where the switch is not turned off, the process returns to Step 106, and this processing is repeated. In a case where the power switch is turned off, the process progresses to Step 142.

In Step 142, the main control unit 26 stops the live view operation, and then, ends this processing. The main control unit 26 turns off the power supply of the distance measurement device 10.

Figure 7:
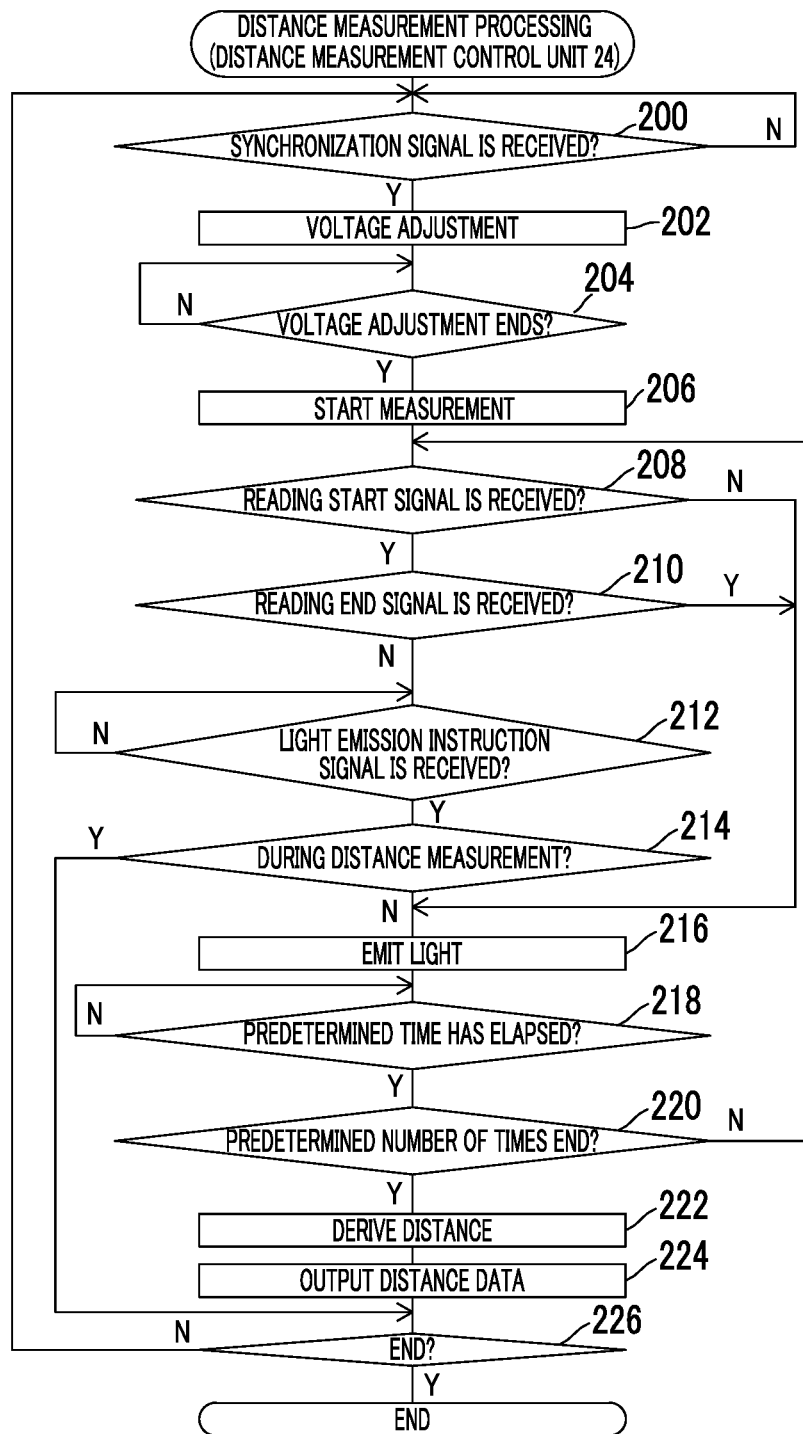
FIG. 7 is a flowchart showing an example of distance measurement processing which is executed by a distance measurement control unit of the distance measurement device according to this embodiment.

Next, distance measurement processing which is executed by the distance measurement control unit 24 will be described. FIG. 7 is a flowchart showing an example of a flow of distance measurement processing which is executed by the distance measurement control unit 24 of the distance measurement device 10 of this embodiment.

The flowchart shown in FIG. 7 is executed if power is supplied to the distance measurement device 10.

First, in Step 200, the distance measurement control unit 24 determines whether or not the synchronization signal is received. Specifically, the distance measurement control unit 24 determines whether or not the synchronization signal transmitted from the main control unit 26 in Step 114 of the control processing in the main control unit 26 described above is received. The process is in a standby state until the synchronization signal is received, and if the synchronization signal is received, the process progresses to Step 202.

In Step 202, the distance measurement control unit 24 transits to the voltage adjustment period shown in FIG. 6 and performs voltage adjustment of the drive voltage of the laser diode 32 and the photodiode 36.

Next, in Step 204, the distance measurement control unit 24 determines whether or not the voltage adjustment ends. In this embodiment, as described above and as shown in FIG. 6, the voltage adjustment period is set to several 100 msec. For this reason, the distance measurement control unit 24 determines that the voltage adjustment ends in a case where several 100 msec have elapsed after the transition to the voltage adjustment period. Accordingly, the distance measurement control unit 24 determines that the voltage adjustment does not end and is in a standby state until several 100 msec have elapsed after the transition to the voltage adjustment period, and in a case where several 100 msec have elapsed, determines that the voltage adjustment ends and progresses to Step 206.

In Step 206, the distance measurement control unit 24 transits to the actual measurement period and starts to measure the distance to the subject.

Next, in Step 208, the distance measurement control unit 24 determines whether or not the reading start signal is received. Specifically, the distance measurement control unit 24 determines whether or not the reading start signal transmitted from the main control unit 26 in Step 122 of the control processing in the main control unit 26 described above is received.

For this reason, the distance measurement control unit 24 of the distance measurement device 10 of this embodiment performs control such that, in a reading period, the laser diode 32 emits light in the above-described horizontal blanking period which is a period during which the charge signals are not read from the pixels. That is, the distance measurement control unit 24 performs control such that, in the reading period, the laser diode 32 emits light in synchronization with the imaging operation.

As described above, in a period out of the reading period, since superimposition of noise due to variation in voltage does not cause a problem, the laser diode 32 may not emit light in synchronization with the imaging operation, and as described above, the laser diode 32 may emit light every several msec according to each measurement. Hereinafter, control by the distance measurement control unit 24 in a period out of the reading period is referred to as "normal control".

For this reason, in the distance measurement control unit 24 of the distance measurement device 10 of this embodiment, control in the measurement of the distance to the subject is different between the reading period and a period out of the reading period.

In Step 208, since the distance measurement control unit 24 performs the normal control in a case where the reading start signal is not received, the process progresses to Step 216. In a case where the distance measurement control unit 24 receives the reading start signal, the process progresses to Step 210.

In Step 210, the distance measurement control unit 24 determines whether or not the reading end signal is received.

Specifically, the distance measurement control unit 24 determines whether or not the reading end signal transmitted from the main control unit 26 in Step 130 of the control processing in the main control unit 26 described above is received.

Since the distance measurement control unit 24 performs the normal control in a subsequent period in a case where the reading end signal is received, the process progresses to Step 216. In a case where the distance measurement control unit 24 does not receive the reading end signal, the process progresses to Step 212.

In Step 212, the distance measurement control unit 24 determines whether or not the light emission instruction signal is received. Specifically, the distance measurement control unit 24 determines whether or not the light emission instruction signal transmitted from the main control unit 26 in Step 126 of the control processing in the main control unit 26 described above is received.

In a case where the distance measurement control unit 24 does not receive the light emission instruction signal, that is, in a case where it is in the reading period and it is not yet in the horizontal blanking period, the process is in the standby state. In a case where the distance measurement control unit 24 receives the light emission instruction signal, the process progresses to Step 214. In Step S214, it is determined whether or not the measurement is being performed. In the distance measurement device 10 of this embodiment, the interval (the reading time of the charge signals from the pixels of one pixel row) between the horizontal blanking periods is shorter than the single measurement time (in the specific example described above, several msec). For this reason, before the measurement ends, the next horizontal blanking period may be reached, and the light emission instruction signal may be transmitted from the main control unit 26 to the distance measurement control unit 24. In the distance measurement control unit 24 of this embodiment, in this way, in a case where the light emission instruction signal is received during the measurement, the received light emission instruction signal is neglected, whereby the laser diode 32 does not emit light. For this reason, in a case where the measurement is being performed, the process progresses to Step 226. In a case where the measurement is not being performed, the process progresses to Step 216.

In Step 216, the distance measurement control unit 24 causes the laser diode 32 to emit light. Next, in Step 218, the distance measurement control unit 24 determines whether or not a predetermined time has elapsed. Specifically, as described above, since the single measurement time is set to several msec, the distance measurement control unit 24 determines whether or not several msec have elapsed. In a case where the predetermined time (in this embodiment, several msec which are the single measurement time) has not elapsed, the process is in the standby state, and in a case where the predetermined time has elapsed, the process progresses to Step 220.

The laser diode 32 emits light through the processing of Step 216, whereby the laser beam is emitted toward the subject through the light emitting lens 30. The laser beam reflected from the subject is received by the photodiode 36 through the light receiving lens 34 until the predetermined time elapses. The distance measurement control unit 24 acquires the elapsed time from light emission to light reception in a case where the laser beam is received by the photodiode 36 and stores the elapsed time in the storage unit (for example, the RAM or the like in the distance measurement control unit 24).

For example, in a case where the subject moves, or the like, the elapsed time from light emission to light reception of the laser beam exceeds several msec which are the actual measurement time per measurement, and the laser beam may not be returned (reflected light may not be received). In this case, a measurement error occurs. In a case where a measurement error occurs, the distance measurement control unit 24 stores the effect in the storage unit (for example, the RAM or the like in the distance measurement control unit 24), and the occurrence of the measurement error may be displayed on the view finder 46 or the like according to the frequency of the occurrence of the measurement error, for example, if the frequency is not negligible in deriving the distance to the subject using a histogram. In this way, in a case where a measurement error occurs, the main control unit 26 may not store the captured image in the storage unit 48. In this case, the user can set whether or not to store the captured image through the operating unit 44 (an example of a storage setting unit according to the technique of the present disclosure).

Next, in Step 220, the distance measurement control unit 24 determines whether or not a predetermined number of measurements end. In a case where a predetermined number of measurements do not end, the process returns to Step 208, and the measurement is repeated. In a case where a predetermined number of measurements end, the process progresses to Step 222.

In Step 222, the distance to the subject is derived based on the time from when the photodiode 36 emits the laser beam through the processing of Step 216 until the photodiode 36 receives the laser beam. As an example, as shown in FIG. 4, the distance measurement control unit 24 generates a histogram of the distance to the subject and derives the distance to the subject corresponding to a maximum value of the measurement frequency from the histogram as a measurement result. In a case where a histogram relating to the time, such as the reciprocation time of the laser beam, is generated, first, the time corresponding to the maximum value of the measurement frequency may be derived, and the distance to the subject may be derived based on the derived time. For example, in a case of a histogram relating to the reciprocation time of the laser beam, the distance to the subject may be derived by ½ of the reciprocation time of the laser beam corresponding to the maximum value of the measurement frequency×the light speed.

Next, in Step 224, the distance measurement control unit 24 transmits distance data indicating the distance derived in Step 222 to the main control unit 26, and then, the process progresses to Step 226.

In Step 226, the distance measurement control unit 24 determines whether or not to end this distance measurement processing. In a case where end conditions determined in advance are satisfied, for example, in a case where the main control unit 26 determines that the power switch is turned off, this distance measurement processing ends. In a case where the end conditions are not satisfied, the process returns to Step 200, and this distance measurement processing is repeated.

As described above, in the distance measurement device 10 of this embodiment, in a case of performing the imaging operation and the distance measurement operation in parallel, the main control unit 26 performs control such that shake correction is not performed. In a case of performing only the imaging operation, control is performed such that shake correction is performed.

In this way, since the main control unit 26 of the distance measurement device 10 of this embodiment does not perform shake correction during the distance measurement, the central position of the image formed on the imaging element 42 is not deviated from the irradiation position of the laser beam emitted by the laser diode 32. Therefore, according to the distance measurement device 10 of this embodiment, it is possible to suppress degradation of distance measurement accuracy due to shake correction.

In this embodiment, although a case where, in a case of performing the imaging operation and the distance measurement operation in parallel, the main control unit 26 performs control such that shake correction is not performed has been described, the invention is not limited thereto, and a shake correction amount may be smaller than that in a case of performing normal imaging. A flowchart illustrating control processing in this case is shown in FIG. 8. In the control processing in this case, Step 103 may be provided instead of Step 104 of the control processing shown in FIG. 5, and Step 137 may be provided instead of Step 136. In FIG. 8, subsequent processing is the same as in the control processing shown in FIG. 5, and thus, description thereof will not be repeated.

In the control processing shown in FIG. 8, the main control unit 26 progresses to Step 137 in a case of not performing the distance measurement, performs shake correction with a shake correction amount A, and then, progresses to Step 138 to perform normal imaging. The shake correction amount A is a shake correction amount in a case of performing normal imaging, and is a correction amount for appropriately capturing an image of the subject.

The main control unit 26 progresses to Step 103 in a case of performing the distance measurement, performs shake correction with a shake correction amount B, and then, progresses to Step 106 to perform the imaging operation in parallel with the distance measurement operation. The shake correction amount B is a correction amount smaller than the shake correction amount A. The correction amount B may be determined according to degradation of distance measurement accuracy and image quality of the captured image, and may be determined, for example, by an experiment or the like in advance taking into consideration the influence on distance measurement accuracy.

Figure 10A:
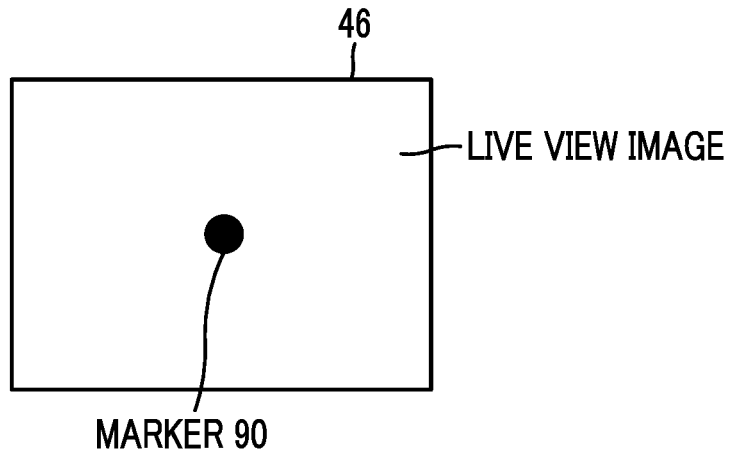
FIG. 10A is a diagram illustrating a marker representing an irradiation position which is displayed on a live view image of a view finder in a superimposed manner.
Figure 10B:
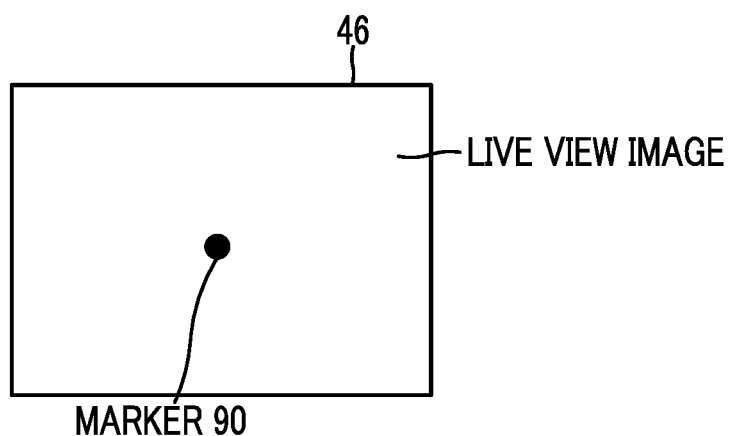
FIG. 10B is a conceptual diagram showing an example of a marker which represents an irradiation position displayed on a live view image of a view finder in a superimposed manner and is displayed large.
Figure 10C:
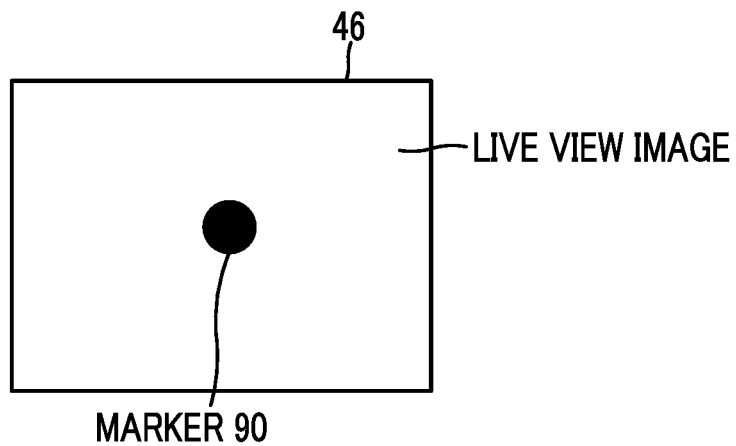
FIG. 10C is a conceptual diagram showing an example of a marker which represents an irradiation position displayed on a live view image of a view finder in a superimposed manner and is displayed small.

In a case of performing shake correction during the distance measurement operation, as described above, the irradiation position of the laser beam moves. For this reason, the irradiation position may be displayed on the view finder 46. A flowchart illustrating control processing in this case is shown in FIG. 9. In the control processing shown in FIG. 9, Step 105 is provided between Steps 103 and 106 of the control processing shown in FIG. 8. In a case of performing a main imaging operation and the distance measurement operation in parallel, the main control unit 26 sets the shake correction amount to the shake correction amount B, and then, in Step 105, displays a marker representing the irradiation position on a live view image displayed on the view finder 46 in a superimposed manner. FIGS. 10A to 10C show a display example of a marker 90. As shown in FIG. 10A, the marker 90 is displayed on a live view image displayed on the view finder 46 in a superimposed manner. The size of the marker 90 may be different depending on a shake amount. The main control unit 26 computes a shake amount based on a detection result of the shake detection unit 43, in a case where the shake amount is large, as shown in FIG. 10B, displays the marker 90 large, and in a case where the shake amount is small, as shown in FIG. 10C, displays the marker 90 small.

In this embodiment, although an imaging operation in a case of capturing a still image has been described, even in a case of capturing a motion image, as in this embodiment, the main control unit 26 may control shake correction. In a case of displaying a live view image, and in a case of performing shake correction, as in this embodiment, the main control unit 26 may control shake correction regardless of the imaging operation.

In this embodiment, although the distance measurement control unit 24 performs control such that the laser diode 32 emits light in the horizontal blanking period, a timing at which the laser diode 32 emits light may be a period during which the degree of influence on the reading state of the image signal is equal to or less than an allowable degree determined in advance. When the degree of influence is the allowable degree determined in advance, for example, there is a case where image disruption to the extent of causing no problem (being unnoticeable) in a case where the user visually recognizes the captured image is set within an allowable range, or the like. The laser diode 32 may emit light in a period (a so-called vertical blanking period or the like) during which the charges are not read between the frames in reading the charges, not in the horizontal blanking period.

As a method of synchronizing the distance measurement operation by the distance measurement control unit 24 with the imaging operation by the main control unit 26, a clock signal of the time counter 22 may be controlled using the main control unit 26.

Figure 11A:
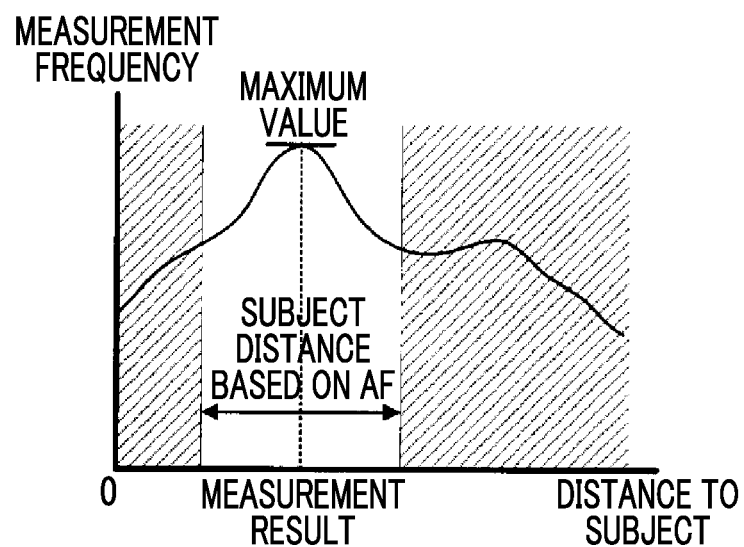
FIG. 11A is a modification example of a histogram obtained in the distance measurement device according to the embodiment, and is a diagram illustrating an example of deriving a distance to a subject without using a measurement result other than a subject distance range based on AF.
Figure 11B:
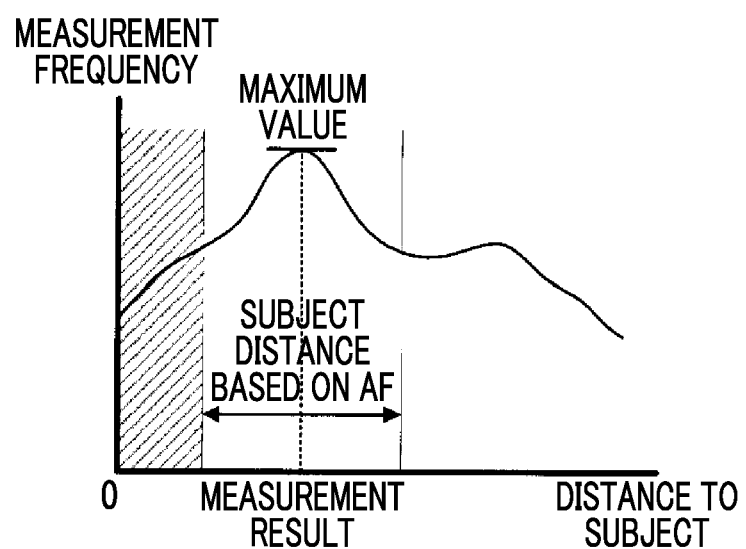
FIG. 11B is a modification example of a histogram obtained in the distance measurement device according to the embodiment, and is a diagram illustrating an example of deriving a distance to a subject without using a measured value of a distance less than a subject distance based on AF.
Figure 11C:
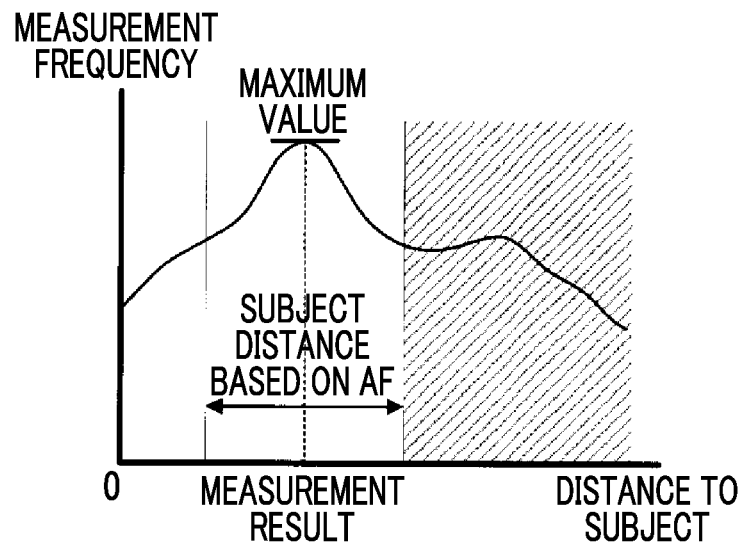
FIG. 11C is a modification example of a histogram obtained in the distance measurement device according to the embodiment, and is a diagram illustrating an example of deriving a distance to a subject without using a measured value of a distance longer than a subject distance based on AF.

In this embodiment, although an example where the distance measurement control unit 24 derives the distance to the subject by performing a measurement using the emission and reception of the laser beam multiple times (for example, several 100 times) has been described, a focus adjustment result may be used when deriving the distance. For example, when analyzing the histogram (FIG. 4) generated from a plurality of measurement results using the emission and reception of the laser beam, the distance range (the range of the subject distance and the vicinity thereof) of the distance to the subject is understood from the AF result. Accordingly, as shown in FIG. 11A, the distance to the subject may be derived only using the measurement results within the subject distance range based on AF without using the measurement results (hatched portions in FIG. 11A) outside the subject distance range based on AF. With this, if the distance range is determined, since a resolution is uniquely determined, it is possible to increase the resolution of the distance range when determining the frequency compared to using all measured values, and to derive the distance to the subject in units of minute numerical values. In the example of FIG. 11A, although an example in which the measured values of the distances shorter and the distances longer than the subject distance range based on AF are not used together has been shown, either of them may not be used. That is, the distance to the subject may be derived without using the measured values (a hatched portion in FIG. 11B) of the distances less than the subject distance based on AF or the measured values (a hatched portion in FIG. 11C) of the distances longer than the subject distance based on AF. Furthermore, a result of manual focus adjustment in the manual focus mode may be used instead of AF.

Figure 12:
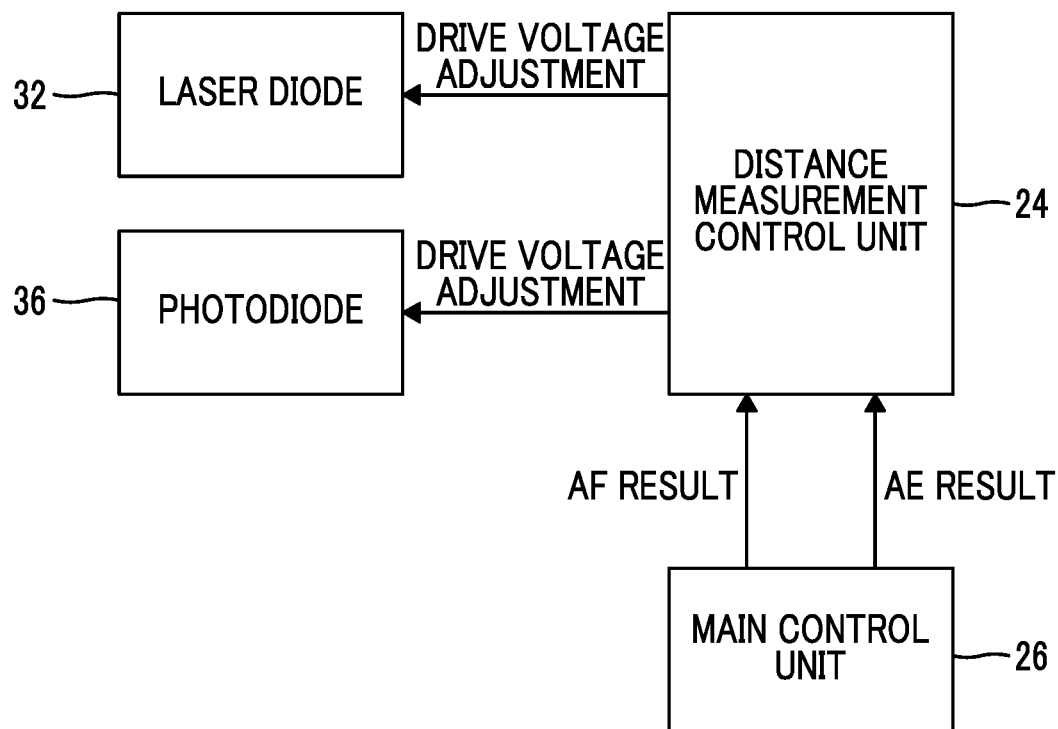
FIG. 12 is an explanatory view illustrating adjustment of emission intensity of a laser beam or light receiving sensitivity of a photodiode based on an AF result or an AE result.

In this embodiment, in a case where the distance measurement control unit 24 performs the distance measurement, as shown in FIG. 12, the focusing state specification information specifying the AF result (or the manual focus adjustment result) or the exposure state specification information specifying the AE result is acquired from the main control unit 26, and at least one of the laser diode 32 or the photodiode 36 may be driven and adjusted based on the acquired focusing state specification information and exposure state specification information. That is, since an approximate distance to the subject is understood from the focus adjustment result (focal distance), the emission intensity of the laser beam emitted from the laser diode 32 may be adjusted based on the focusing state specification information specifying the AF result. For example, the shorter the focal distance, the lower the emission intensity is set. With this, while ambient light becomes noise, it is possible to derive the distance to the subject with proper emission intensity of the laser beam without being affected by noise of ambient light. Similarly, since an approximate distance to the subject is understood from the focus adjustment result, the light receiving sensitivity of the photodiode 36 may be adjusted based on the focusing state specification information specifying the AF result. For example, the shorter the focal distance, the lower the light receiving sensitivity is set. With this, it is possible to derive the distance to the subject with proper light receiving sensitivity without being affected by noise of ambient light. Alternatively, since necessary intensity of the laser beam is understood from the exposure adjustment result, the emission intensity of the laser beam may be adjusted based on the exposure state specification information specifying the AE result. For example, the higher the exposure, the lower the emission intensity is set. Alternatively, since high exposure means that subject brightness becomes low, the lower the subject brightness, the lower the emission intensity may be set. With this, it is possible to derive the distance to the subject with proper emission intensity of the laser beam without being affected by noise of ambient light.

In this embodiment, although a case where the distance measurement device 10 captures a still image has been described, even in a case of capturing a motion image, the main control unit 26 may perform control as described above. In capturing a motion image, a measurement (measurement sequence) may be repeatedly performed. Furthermore, a still image may be repeatedly captured during a single measurement.

Figure 13:
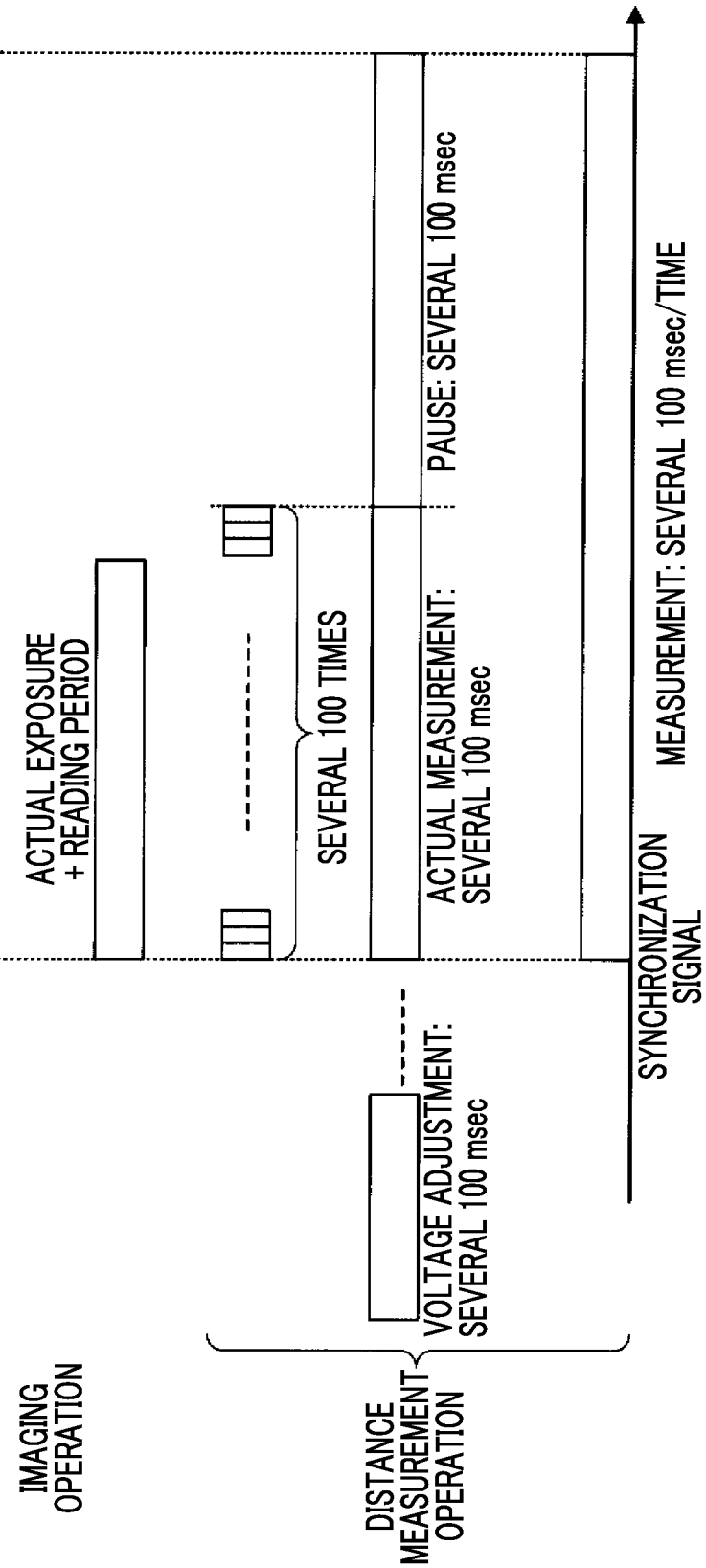
FIG. 13 is another example of a timing chart representing the timings of an imaging operation and a distance measurement operation in the distance measurement device according to this embodiment.

In this embodiment, although a case where voltage adjustment is performed simultaneously with the distance measurement start timing and the actual exposure start timing has been illustrated, the technique of the present disclosure is not limited thereto. For example, as shown in FIG. 13, prior to the start of the distance measurement and the start of the actual exposure, as a specific example, the voltage adjustment may be performed in a period during which a live view image is displayed, or the like. In this case, for example, in the distance measurement processing by the distance measurement control unit 24 shown in FIG. 7, the processing of Steps 202 and 204 may be performed prior to Step 200. Furthermore, the voltage adjustment may not be performed.

In the above-described embodiment, although a case where information relating to the distance to the subject is displayed on the view finder 46 so as to be superimposed on a live view image has been illustrated, the technique of the present disclosure is not limited thereto. For example, information relating to the distance to the subject may be displayed in a display area different from the display area of the live view image. In this way, information relating to the distance to the subject may be displayed on the view finder 46 in parallel with the display of the live view image.

In the above-described embodiment, for convenience of description, although description has been provided on an assumption that there is no AF error, the technique of the present disclosure is not limited thereto. That is, the distance measurement control unit 24 may derive the distance as described above in a case where an AF error does not occur, and may not derive the distance in a case where an AF error occurs.

In the above-described embodiment, for convenience of description, although description has been provided on an assumption that there is no AE error, the technique of the present disclosure is not limited thereto. That is, the distance measurement control unit 24 may derive the distance as described above in a case where an AE error does not occur, and may not derive the distance in a case where an AE error occurs.

In the above-described embodiment, although the focus adjustment and the exposure adjustment by AF and AE have been illustrated, the technique of the present disclosure is not limited thereto, focus adjustment by manual focus and exposure adjustment by manual exposure may be applied.

In the above-described embodiment, although a case where the release button provided in the distance measurement device 10 is operated has been illustrated, the technique of the present disclosure is not limited thereto. For example, AE and AF may be started in response to an imaging preparation instruction received by a user interface (UI) unit of an external device used in the form of being connected to the distance measurement device 10, and actual exposure may be started in response to an imaging instructed received by the UI unit of the external device. Examples of the external device used in the form of being connected to the distance measurement device 10 include a smart device, a personal computer (PC), or a spectacles type or a wristwatch type wearable terminal device.

In the above-described embodiment, although a case where the live view image and the distance measurement result (information relating to the distance to the subject) are displayed on the view finder 46 has been illustrated, the technique of the present disclosure is not limited thereto. For example, at least one of the live view image or the distance measurement result may be displayed on a display unit of the external device used in the form of being connected to the distance measurement device 10. Examples of the display unit of the external device used in the form of being connected to the distance measurement device 10 include a display of a smart device, a display of a PC, or a display of a wearable terminal device.

The control processing (see FIG. 5) and the distance measurement processing (see FIGS. 5A and 5B) described in the above-described embodiment are merely examples. Accordingly, it is needless to say that unnecessary steps may be deleted, new steps may be added, or the processing order may be rearranged without departing the gist of the invention. The respective processing included in the control processing and the distance measurement processing described in the above-described embodiment may be realized by a software configuration using a computer by executing a program, or may be realized by other hardware configurations. Furthermore, the respective processing may be realized by a combination of a hardware configuration and a software configuration.

Furthermore, it is needless to say that the technique of the present disclosure can also be applied to a digital camera.

In the above-described embodiment, although a case where the light emission frequency of the laser beam is fixed has been illustrated, the technique of the present disclosure is not limited thereto. Since ambient light becomes noise for the laser beam, the light emission frequency of the laser beam may be a light emission frequency determined according to subject brightness.

Hereinafter, an example of a way of determining the light emission frequency of the laser beam will be described.

Figures 14, 15:
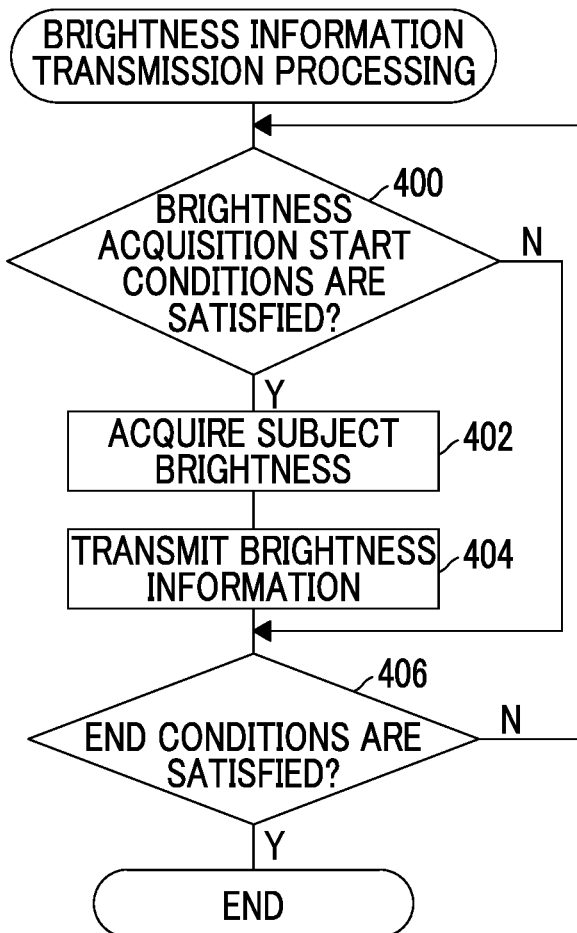
FIG. 14 is a conceptual diagram showing an example of the configuration of a light emission frequency determination table.
FIG. 15 is a flowchart showing an example of a flow of brightness information transmission processing.

The light emission frequency of the laser beam is derived from a light emission frequency determination table 300 shown in FIG. 14 as an example. In the light emission frequency determination table 300, the subject brightness and the light emission frequency of the laser beam are correlated with each other such that the higher the subject brightness, the larger the light emission frequency of the laser beam becomes. That is, in the light emission frequency determination table 300, the subject brightness has a magnitude relationship of $L_1 < L_2 < \ldots < L_n$, and the light emission frequency has a magnitude relationship of $N_1 < N_2 < \ldots < N_n$. In the example shown in FIG. 2, although the light emission frequency in units of 100 times has been illustrated, the invention is not limited thereto, and the light emission frequency may be determined in units of ten times or once by the light emission frequency determination table 300.

In the distance measurement device 10, in order to realize the derivation of the light emission frequency of the laser beam by the light emission frequency determination table 300, brightness information transmission processing (see FIG. 15) is executed by the main control unit 26, and light emission frequency determination processing (see FIG. 16) is executed by the distance measurement control unit 24.

First, the brightness information transmission processing which is executed by the main control unit 26 if the power switch of the distance measurement device 10 is turned on will be described referring to FIG. 15.

In the brightness information transmission processing shown in FIG. 15, first, in Step 400, the main control unit 26 determines whether or not brightness acquisition start conditions which are conditions for starting acquisition of subject brightness are satisfied. An example of the brightness acquisition start conditions is a condition that the release button is half-pressed. Another example of the brightness acquisition start conditions is a condition that the captured image is output from the imaging element 42.

In Step 400, in a case where the brightness acquisition start conditions are satisfied, the determination is affirmative, and the process progresses to Step 402. In Step 400, in a case where the brightness acquisition start conditions are not satisfied, the determination is negative, and the process progresses to Step 406.

In Step 402, the main control unit 26 acquires the subject brightness from the captured image, and then, the process progresses to Step 404. Here, although a case where the subject brightness is acquired from the captured image has been illustrated, the technique of the present disclosure is not limited thereto. For example, if a brightness sensor which detects subject brightness is mounted in the distance measurement device 10, the main control unit 26 may acquire the subject brightness from the brightness sensor.

In Step 404, the main control unit 26 transmits brightness information indicating the subject brightness acquired in Step 402 to the distance measurement control unit 24, and then, the process progresses to Step 406.

In Step 406, the main control unit 26 determines whether or not end conditions which are conditions for ending this brightness information transmission processing are satisfied. An example of the end conditions is a condition that the power switch of the distance measurement device 10 is turned off. In Step 406, in a case where the end conditions are not satisfied, the determination is negative, and the process progresses to Step 400. In Step 406, in a case where the end conditions are satisfied, the determination is affirmative, and this brightness information transmission processing ends.

Next, the light emission frequency determination processing which is executed by the distance measurement control unit 24 if the power switch of the distance measurement device 10 is turned on will be described referring to FIG. 16.

Figures 16, 17:
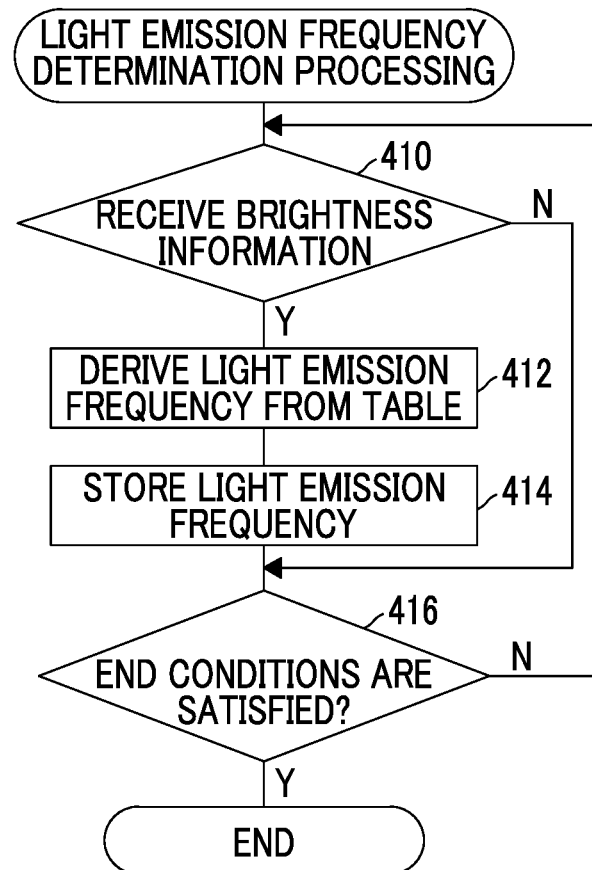
FIG. 16 is a flowchart showing an example of a flow of light emission frequency determination processing.
FIG. 17 is a conceptual diagram showing another example of the configuration of a light emission frequency determination table.

In the light emission frequency determination processing shown in FIG. 16, first, in Step 410, the distance measurement control unit 24 determines whether or not the brightness information transmitted by executing the processing of Step 404 is received. In Step 410, in a case where the brightness information transmitted by executing the processing of Step 404 is not received, the determination is negative, and the process progresses to Step 416. In Step 410, in a case where the brightness information transmitted by executing the processing of Step 404 is received, the determination is affirmative, and the process progresses to Step 412.

In Step 412, the distance measurement control unit 24 derives the light emission frequency corresponding to the subject brightness indicated by the brightness information received in Step 410 from the light emission frequency determination table 300, and then, the process progresses to Step 414.

In Step 414, the distance measurement control unit 24 stores the light emission frequency derived in the processing of Step 412 in the storage unit 48, and then, the process progresses to Step 416. The light emission frequency stored in the storage unit 48 by the processing of Step 416 means "a predetermined number of times" in Step 220 of the distance measurement processing shown in FIG. 7.

In Step 416, the main control unit 26 determines whether or not end conditions which are conditions for ending this light emission frequency determination processing are satisfied. An example of the end conditions is a condition that the power switch of the distance measurement device 10 is turned off. In Step 416, in a case where the end conditions are not satisfied, the determination is negative, and the process progresses to Step 410. In Step 416, in a case where the end conditions are satisfied, the determination is affirmative, and this light emission frequency determination processing ends.

Next, another example of a way of determining the light emission frequency of the laser beam will be described.

As an example, the light emission frequency of the laser beam is derived according to a light emission frequency determination table 500 shown in FIG. 17. In the light emission frequency determination table 500, exposure state specification information ($E_1$, $E_2$, . . . , $E_n$) uniquely determined according to the subject brightness and the light emission frequency ($N_1$, $N_2$, . . . , $N_n$) of the laser beam are correlated with each other. Here, the exposure state specification information uniquely determined according to the subject brightness means, for example, exposure state specification information indicating that, the higher the subject brightness, the lower the exposure becomes.

In a case of deriving the light emission frequency of the laser beam using the light emission frequency determination table 500, exposure state specification information transmission processing (see FIG. 18) is executed by the main control unit 26, and light emission frequency determination processing (see FIG. 19) is executed by the distance measurement control unit 24.

First, the exposure state specification information transmission processing which is executed by the main control unit 26 if the power switch of the distance measurement device 10 is turned on will be described referring to FIG. 18.

Figure 18:
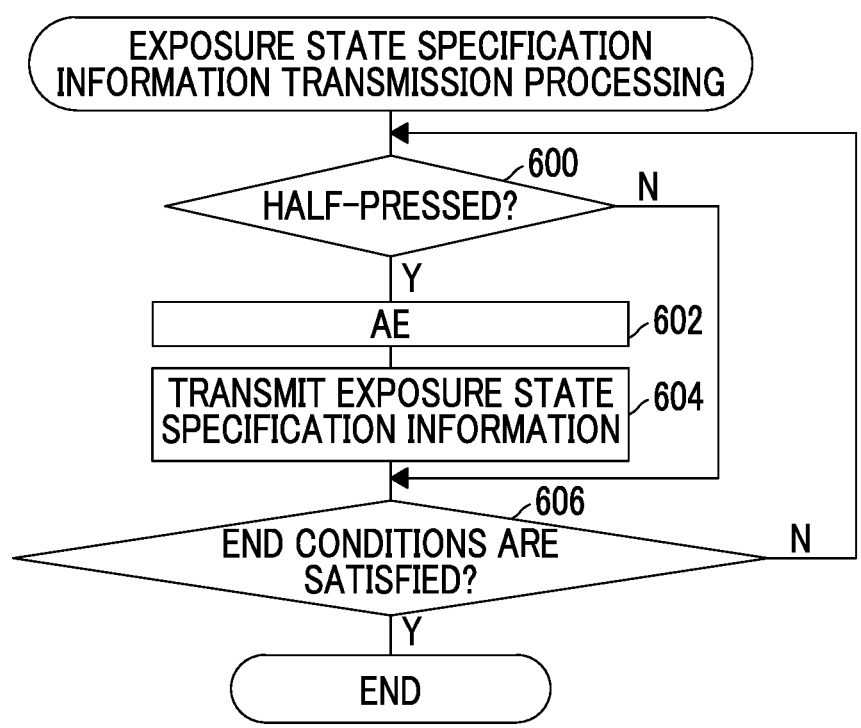
FIG. 18 is a flowchart showing another example of a flow of exposure state specification information transmission processing.

In the exposure state specification information transmission processing shown in FIG. 18, first, in Step 600, the main control unit 26 determines whether or not the release button is half-pressed. In Step 600, in a case where the release button is not half-pressed, the determination is negative, and the process progresses to Step 606. In Step 600, in a case where the release button is half-pressed, the determination is affirmative, and the process progresses to Step 602. In FIG. 18, although a case where the operating unit 44 comprises the release button has been described as an example, the technique of the present disclosure is not limited thereto. For example, in a case where the operating unit 44 comprises a distance measurement imaging start button, Step 600 may be omitted, and in a case where power is supplied, the processing of Step 602 may be started.

In Step 602, the main control unit 26 performs AE based on the subject brightness acquired from the captured image, and then, the process progresses to Step 604.

In Step 604, the main control unit 26 transmits the exposure state specification information to the distance measurement control unit 24, and then, the process progresses to Step 606.

In Step 606, the main control unit 26 determines whether or not end conditions which are conditions for ending this exposure state specification information transmission processing are satisfied. An example of the end conditions is a condition that the power switch of the distance measurement device 10 is turned off. In Step 606, in a case where the end conditions are not satisfied, the determination is negative, and the process progresses to Step 600. In Step 606, in a case where the end conditions are satisfied, the determination is affirmative, and this exposure state specification information transmission processing ends.

Next, the light emission frequency determination processing which is executed by the distance measurement control unit 24 if the power switch of the distance measurement device 10 is turned on will be described referring to FIG. 19.

Figure 19:
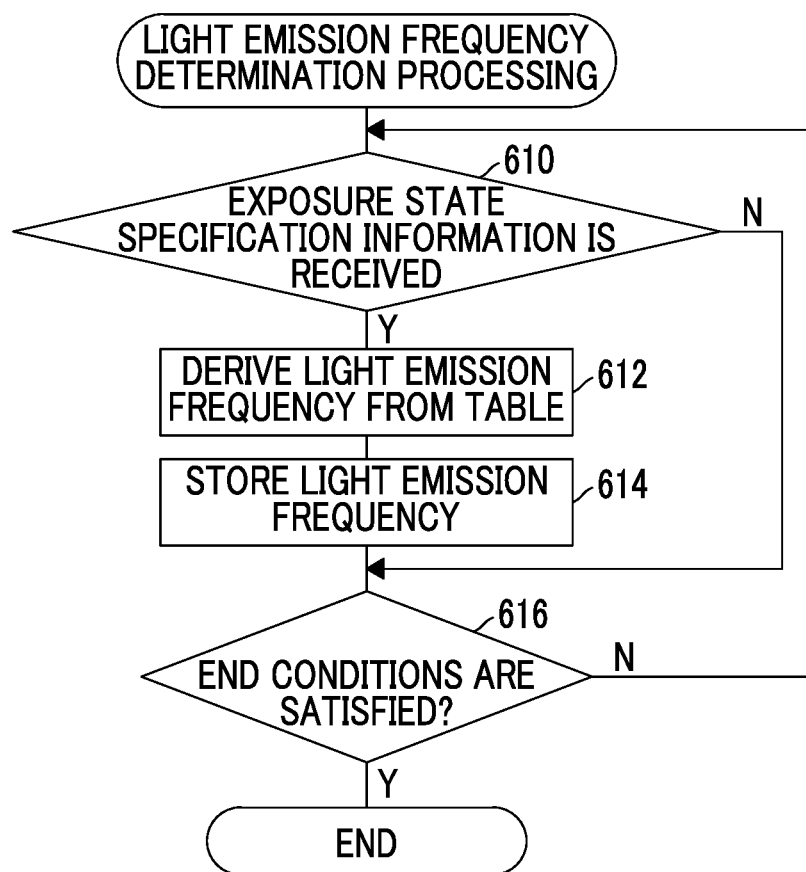
FIG. 19 is a flowchart showing another example of a flow of light emission frequency determination processing.

In the light emission frequency determination processing shown in FIG. 19, first, in Step 610, the distance measurement control unit 24 determines whether or not the exposure state specification information transmitted by executing the processing of Step 604 is received. In Step 610, in a case where the exposure state specification information transmitted by executing the processing of Step 604 is not received, the determination is negative, and the process progresses to Step 616. In Step 610, in a case where the exposure state specification information transmitted by the executing the processing of Step 604 is received, the determination is affirmative, and the process progresses to Step 612.

In Step 612, the distance measurement control unit 24 derives the light emission frequency corresponding to the exposure state specification information received in Step 610 from the light emission frequency determination table 500, and then, the process progresses to Step 614.

In Step 614, the distance measurement control unit 24 stores the light emission frequency derived in the processing of Step 612 in the storage unit 48, and then, the process progresses to Step 616. The light emission frequency stored in the storage unit 48 by the processing of Step 616 means "a predetermined number of times" in Step 220 of the distance measurement processing shown in FIG. 7.

In Step 616, the main control unit 26 determines whether or not end conditions which are conditions for ending this exposure state specification information transmission processing are satisfied. An example of the end conditions is a condition that the power switch of the distance measurement device 10 is turned off. In Step 616, in a case where the end conditions are not satisfied, the determination is negative, and the process progresses to Step 610. In Step 616, in a case where the end conditions are satisfied, the determination is affirmative, and this exposure state specification information transmission processing ends.

In this way, since the distance measurement device 10 makes the light emission frequency (distance measurement frequency) of the laser beam larger when the subject brightness is higher, it is possible to obtain a distance measurement result, in which the influence of noise of ambient light is moderated, compared to a case where the light emission frequency (distance measurement frequency) of the laser beam is fixed regardless of the subject brightness.

In the above-described embodiment, although the laser beam has been illustrated as light for distance measurement, the technique of the present disclosure is not limited thereto, and directional light which is light having directivity may be used. For example, directional light which is obtained by a light emitting diode (LED) or a super luminescent diode (SLD) may be used. The directivity of directional light is preferably the same directivity as the directivity of the laser beam, and is preferably, for example, the directivity usable in a distance measurement within a range of several meters to several kilometers.

The disclosures of Japanese Patent Application No. 2014-095556 filed on May 2, 2014 and Japanese Patent Application No. 2014-159806 filed on Aug. 5, 2014 are incorporated by reference in this specification.

All documents, patent applications, and technical specifications described in this specification are incorporated by reference in this specification as if each of the documents, the patent applications, and the technical specification is concretely and respectively specified as being incorporated by reference herein.

In regard to the above embodiment, the following appendixes are further disclosed.

APPENDIX 1

A distance measurement device comprising an imaging optical system which forms a subject image indicating a subject, an imaging unit which captures the subject image formed by the imaging optical system, an emission unit which emits a laser beam along an optical axis direction of the imaging optical system, a light receiving unit which receives reflected light of the laser beam from the subject, a derivation unit which performs a distance measurement to derive a distance to the subject based on a timing at which the laser beam is emitted by the emission unit and a timing at which the reflected light is received by the light receiving unit, a camera shake correction unit which performs camera shake correction, and a control unit which performs control such that the camera shake correction unit does not perform the camera shake correction or performs the camera shake correction with a correction amount smaller than a normal correction amount determined in advance in a case of performing the distance measurement and performs the camera shake correction with the normal correction amount in a case of not performing the distance measurement.

APPENDIX 2

A distance measurement method comprising performing a distance measurement to derive a distance to a subject based on a timing at which a laser beam is emitted by an emission unit emitting the laser beam along an optical axis direction of an imaging optical system forming a subject image indicating the subject and a timing at which reflected light is received by a light receiving unit receiving the reflected light of the laser beam from the subject, and performing control such that a camera shake correction unit does not perform camera shake correction or performs the camera shake correction with a correction amount smaller than a normal correction amount determined in advance in a case of performing the distance measurement and performs the camera shake correction with the normal correction amount in a case of not performing the distance measurement.

APPENDIX 3

A distance measurement program which causes a computer to execute processing including performing a distance measurement to derive a distance to a subject based on a timing at which a laser beam is emitted by an emission unit emitting the laser beam along an optical axis direction of an imaging optical system forming a subject image indicating the subject and a timing at which reflected light is received by a light receiving unit receiving the reflected light of the laser beam from the subject, and performing control such that a camera shake correction unit does not perform camera shake correction or performs the camera shake correction with a correction amount smaller than a normal correction amount determined in advance in a case of performing the distance measurement and performs the camera shake correction with the normal correction amount in a case of not performing the distance measurement.

The invention claimed is:

1. A distance measurement device comprising:
   an imaging optical system which forms a subject image indicating a subject;
   an imaging unit which captures the subject image formed by the imaging optical system;
   an emission unit which emits directional light as light having directivity along an optical axis direction of the imaging optical system;
   a light receiving unit which receives reflected light of the directional light from the subject;
   a derivation unit which performs a distance measurement to derive a distance to the subject based on a timing at which the directional light is emitted by the emission unit and a timing at which the reflected light is received by the light receiving unit;
   a shake correction unit which performs shake correction as correction of shake of the subject image caused by variation of the optical axis of the imaging optical system; and
   a control unit which performs control such that the shake correction unit does not perform the shake correction, or performs the shake correction with a correction amount smaller than a normal correction amount determined in advance in a case of performing a distance measurement operation relating to the distance measurement and synchronously performing an imaging operation for a still image by the imaging unit, and performs the shake correction with the normal correction amount in a case of performing the imaging operation without performing the distance measurement operation.

2. The distance measurement device according to claim 1, further comprising:
   a reception unit which receives an input of an instruction regarding whether or not to perform the distance measurement by the emission unit, the light receiving unit, and the derivation unit,
   wherein the control unit performs control such that the shake correction unit does not perform the shake correction or performs the shake correction with a correction amount smaller than a normal correction amount determined in advance, in a case where an input of an instruction to perform the distance measurement is received by the reception unit and performs the shake correction with the normal correction amount in a case where an input of an instruction not to perform the distance measurement is received by the reception unit.

3. The distance measurement device according to claim 1, further comprising:
a detection unit which detects the shake,
wherein the shake correction unit calculates a correction amount for correcting the shake based on a detection result of the detection unit, and
the control unit calculates an irradiation position of the directional light irradiated from the emission unit based on the calculated correction amount and displays a marker representing the calculated irradiation position on a display unit.

4. The distance measurement device according to claim 3, wherein the control unit controls the size of the marker representing the irradiation position based on the calculated correction amount.

5. The distance measurement device according to claim 1, wherein the derivation unit performs the derivation of the distance multiple times and derives a distance having a high frequency among the distances obtained by deriving the distance multiple times as a final distance.

6. The distance measurement device according to claim 5, further comprising:
an execution unit which executes at least one of focus adjustment of the imaging optical system with respect to the subject or exposure adjustment,
wherein, in a case where the execution unit executes the focus adjustment, and in a case of deriving the distance, the derivation unit determines a distance range for use when determining the frequency or a time range from the emission of the directional light to the reception of the directional light based on focusing state specification information and derives the final distance within the determined distance range or the determined time range.

7. The distance measurement device according to claim 6, wherein, in a case of deriving the distance, the derivation unit derives the final distance with a resolution determined according to a result of determination of the distance range or the time range.

8. The distance measurement device according to claim 1, wherein the emission unit is able to adjust the emission intensity of the directional light and adjusts the emission intensity based on at least one of focusing state specification information and subject brightness or exposure state specification information to emit the directional light.

9. The distance measurement device according to claim 8, wherein the emission unit makes the emission intensity lower when a focal distance indicated by the focusing state specification information is shorter.

10. The distance measurement device according to claim 8, wherein the emission unit makes the emission intensity lower when the subject brightness is lower and makes the emission intensity lower when the exposure indicated by the exposure state specification information is higher.

11. The distance measurement device according to claim 1, wherein the light receiving unit is able to adjust light receiving sensitivity and adjusts the light receiving sensitivity based on focusing state specification information to receive the reflected light.

12. The distance measurement device according to claim 11, wherein the light receiving unit makes the light receiving sensitivity lower when a focal distance indicated by the focusing state specification information is shorter.

13. The distance measurement device according to claim 1, further comprising:
a display unit which displays an image,
wherein the control unit performs control such that the display unit displays a motion image captured by the imaging unit and displays information relating to the distance to the subject derived by the derivation unit.

14. The distance measurement device according to claim 1, wherein a distance measurement by the emission unit, the light receiving unit, and the derivation unit is performed a number of times determined in advance according to subject brightness or exposure state specification information.

15. The distance measurement device according to claim 14, wherein a distance measurement by the emission unit, the light receiving unit, and the derivation unit is performed a larger number of times when the subject brightness is higher or when the exposure indicated by the exposure state specification information is lower.

16. The distance measurement device according to claim 1, further comprising:
a storage unit which stores the distance derived by the derivation unit,
wherein storage by the storage unit is stopped in a case where the derivation of the distance by the derivation unit is impossible.

17. The distance measurement device according to claim 16, further comprising:
a storage setting unit which sets whether or not to stop storage by the storage unit in a case where the derivation of the distance by the derivation unit is impossible.

18. The distance measurement device according to claim 1, wherein the derivation unit derives the distance in a case where there is no focus adjustment error by a focus adjustment unit performing focus adjustment of the imaging optical system with respect to the subject and there is no exposure adjustment error by an exposure adjustment unit adjusting exposure in a case where the imaging unit performs imaging.

19. A distance measurement method comprising:
performing a distance measurement to derive a distance to a subject based on a timing at which directional light is emitted by an emission unit emitting the directional light as light having directivity along an optical axis direction of an imaging optical system forming a subject image indicating the subject, and a timing at which reflected light is received by a light receiving unit receiving the reflected light of the directional light from the subject; and
performing control such that a shake correction unit does not perform shake correction as correction of shake of the subject image caused by variation of the optical axis of the imaging optical system, or performs the shake correction with a correction amount smaller than a normal correction amount determined in advance, in a case of performing a distance measurement operation relating to the distance measurement and synchronously performing an imaging operation that captures the subject image formed by the imaging optical system as a still image, and the imaging operation, and performs the shake correction with the normal correction amount in a case of performing the imaging operation without performing the distance measurement operation.

20. A non-transitory computer-readable storage medium storing a distance measurement program for causes a computer to execute processing comprising:

performing a distance measurement to derive a distance to a subject based on a timing at which directional light is emitted by an emission unit emitting the directional light as light having directivity along an optical axis direction of an imaging optical system forming a subject image indicating the subject, and a timing at which reflected light is received by a light receiving unit receiving the reflected light of the directional light from the subject; and performing control such that a shake correction unit does not perform shake correction as correction of shake of the subject image caused by variation of the optical axis of the imaging optical system, or performs the shake correction with a correction amount smaller than a normal correction amount determined in advance, in a case of performing a distance measurement operation relating to the distance measurement and synchronously performing an imaging operation that captures the subject image formed by the imaging optical system as a still image, and the imaging operation, and performs the shake correction with the normal correction amount in a case of performing the imaging operation without performing the distance measurement operation.

* * * * *